(12) United States Patent
Khanna et al.

(10) Patent No.: US 10,873,623 B2
(45) Date of Patent: *Dec. 22, 2020

(54) DYNAMICALLY MODIFYING A CLUSTER OF COMPUTING NODES USED FOR DISTRIBUTED EXECUTION OF A PROGRAM

(71) Applicant: Amazon Technologies, Inc., Reno, NV (US)

(72) Inventors: Richendra Khanna, Seattle, WA (US); Peter Sirota, Seattle, WA (US); Ian P. Nowland, Seattle, WA (US); Richard J. Cole, Seattle, WA (US); Jai Vasanth, Bellevue, WA (US); Andrew J. Hitchcock, Seattle, WA (US); Luis Felipe Cabrera, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 655 days.

This patent is subject to a terminal disclaimer.

(21) Appl. No.: 15/133,098

(22) Filed: Apr. 19, 2016

(65) Prior Publication Data

US 2016/0234300 A1 Aug. 11, 2016

Related U.S. Application Data

(63) Continuation of application No. 13/620,805, filed on Sep. 15, 2012, now Pat. No. 9,329,909, which is a
(Continued)

(51) Int. Cl.
| G06F 15/16 | (2006.01) |
| H04L 29/08 | (2006.01) |
| G06F 9/50  | (2006.01) |

(52) U.S. Cl.
CPC ........ *H04L 67/1029* (2013.01); *G06F 9/5072* (2013.01); *G06F 9/5083* (2013.01)

(58) Field of Classification Search
CPC ... H04L 67/1029; G06F 9/5072; G06F 9/5083
(Continued)

(56) References Cited

U.S. PATENT DOCUMENTS

| 6,128,642 A  | 10/2000 | Doraswamy et al. |
| 6,490,693 B1 | 12/2002 | Briskey et al. |

(Continued)

FOREIGN PATENT DOCUMENTS

| CN | 1368809 A   | 9/2002 |
| CN | 101038564 A | 9/2007 |

(Continued)

OTHER PUBLICATIONS

"AmazonEC2—Hadoop Wiki," retrieved on Dec. 12, 2008 from http://wiki.apache.org/hadoop/AmazonEC2?action=print, 10 pages.
(Continued)

*Primary Examiner* — Michael Won
*Assistant Examiner* — Karina J Garcia-Ching
(74) *Attorney, Agent, or Firm* — Nicholson De Vos Webster & Elliott, LLP

(57) ABSTRACT

Techniques are described for managing distributed execution of programs. In some situations, the techniques include dynamically modifying the distributed program execution in various manners, such as based on monitored status information. The dynamic modifying of the distributed program execution may include adding and/or removing computing nodes from a cluster that is executing the program, modifying the amount of computing resources that are available for the distributed program execution, terminating or temporarily suspending execution of the program (e.g., if an
(Continued)

insufficient quantity of computing nodes of the cluster are available to perform execution), etc.

20 Claims, 12 Drawing Sheets

Related U.S. Application Data continuation of application No. 12/415,725, filed on Mar. 31, 2009, now Pat. No. 8,296,419.

(58) Field of Classification Search
USPC .......................................... 709/201
See application file for complete search history.

(56) References Cited

U.S. PATENT DOCUMENTS

| | | | |
|---|---|---|---|
| 6,934,755 | B1 | 8/2005 | Saulpaugh et al. |
| 7,559,060 | B2 | 7/2009 | Schmidt et al. |
| 7,590,746 | B2 | 9/2009 | Slater et al. |
| 7,953,843 | B2 | 5/2011 | Cherkasova |
| 2003/0035009 | A1 | 2/2003 | Kodosky et al. |
| 2004/0181794 | A1 | 9/2004 | Coleman et al. |
| 2004/0210907 | A1 | 10/2004 | Lau et al. |
| 2005/0102398 | A1* | 5/2005 | Zhang ............... H04L 67/1006 709/225 |
| 2005/0120160 | A1* | 6/2005 | Plouffe ............. G06F 9/45537 711/1 |
| 2006/0009945 | A1 | 1/2006 | Fuller, III et al. |
| 2007/0174815 | A1 | 7/2007 | Chrysanthakopoulos et al. |
| 2007/0260733 | A1 | 11/2007 | Havemose et al. |
| 2007/0271570 | A1 | 11/2007 | Brown et al. |
| 2007/0277056 | A1 | 11/2007 | Varadarajan et al. |
| 2008/0082983 | A1 | 4/2008 | Groetzner et al. |
| 2008/0114887 | A1 | 5/2008 | Bryers et al. |
| 2008/0115143 | A1 | 5/2008 | Shimizu et al. |
| 2008/0120314 | A1 | 5/2008 | Yang et al. |
| 2008/0250227 | A1 | 10/2008 | Linderman et al. |
| 2009/0024981 | A1 | 1/2009 | Dye et al. |
| 2009/0037572 | A1 | 2/2009 | Gebhart et al. |
| 2009/0083390 | A1 | 3/2009 | Abu-Ghazaleh et al. |
| 2009/0237084 | A1 | 9/2009 | Itskovich et al. |
| 2009/0307597 | A1* | 12/2009 | Bakman ............... G06F 11/008 715/736 |
| 2010/0076805 | A1 | 3/2010 | Batsakis et al. |
| 2010/0122065 | A1* | 5/2010 | Dean ................. G06F 17/30445 712/203 |

FOREIGN PATENT DOCUMENTS

| | | |
|---|---|---|
| JP | 63-85846 A | 4/1988 |
| JP | 8-123768 A | 5/1996 |
| JP | 2008-502953 A | 1/2008 |
| JP | 2008-123357 A | 5/2008 |
| JP | 2008-293358 A | 12/2008 |

OTHER PUBLICATIONS

"Hadoop," retrieved on Dec. 12, 2008, from http://en.wikipedia.org/wiki/Hadoop, 5 pages.
"MapReduce," retrieved on Dec. 12, 2008, from http://en.wikipedia.org/wiki/Mapreduce, 6 pages.
"Storage Area Network," retrieved on Dec. 12, 2008, from http://en.wikipedia.org/wiki/Storage_area_network, 5 pages.
"RAID," retrieved on Dec. 12, 2008, from http://en.wikipedia.org/wiki/RAID, 14 pages.
Varia, J., "Building GrepTheWeb in the Cloud, Part 1: Cloud Architectures," Jul. 16, 2008, retrieved Dec. 12, 2008, from http://developer.amazonwebservices.com/connect/entry!default.jspa?categoryID=152&ex . . . , 8 pages.
Varia, J., "Building GrepTheWeb in the Cloud, Part 2: Best Practices," Jul. 15, 2008, retrieved Dec. 12, 2008, from http://developer.amazonwebservices.com/connect/entry!default.jspa?categoryID=152 &ex . . . , 3 pages.
White, T., "Running Hadoop MapReduce on Amazon EC2 and Amazon S3," Jul. 18, 2007, retrieved Dec. 12, 2008, from http://developer.amazonwebservices.com/connect/entry.jspa?externalID=873, 7 pages.
"Condor Project Homepage," retrieved on Mar. 26, 2009, from http://www.cs.wisc.edu/condor/, 3 page.
"What is Condor?" retrieved on Mar. 26, 2009, from http://www.cs.wisc.edu/condor/description.html, 2 pages.
"An Overview of the Condor System," retrieved on Mar. 26, 2009, from http://www.cs.wisc.edu/condor/overview/, 4 pages.
"Welcome to Hive!" retrieved on Mar. 26, 2009, from http://hadoop.apache.org/hive/, 1 page.
"Hive—Hadoop Wiki," retrieved on Mar. 26, 2009, from http://wiki.apache.org/hadoop/Hive?action=print, 2 pages.
"Project Pig," retrieved on Mar. 26, 2009, from http://research.yahoo.com/node/90, 1 page.
Olston, C., et al, "Pig Latin: A Not-So-Foreign Language for Data Processing," SIGMOD, Jun. 9-12, 2008, Vancouver, BC, Canada, 12 pages.
Badrinath, R., et al., "Virtualization Aware Job Schedulers for Checkpoint-Restart," International Conference on Parallel and Distributed Systems, IEEE, Dec. 5, 2007, pp. 1-7.
Casas, J., et al., "MPVM: A Migration Transparent Version of PVM," Computing Systems USA, vol. 8, No. 2, 1995, pp. 171-216.
Mehnert-Spahn et al., "Checkpointing Process Groups in a Grid Environment," 2008 Ninth International Conference on Parallel and Distributed Computing, Applications and Technologies, Dec. 1-4, 2008, 9 pages.
Wang et al., "The Cumulus Project: Build a Scientific Cloud for a Data Center," Cloud Computing and Applications, Oct. 22-23, 2008, Chicago, Ill., 7 pages.
Hua et al., "Distributed Layered Resource Management Model in Blue Whale Distributed File System," *Journal of Computer Research and Development* 42(6):1034-1038, 2005.
Nakajima et al., "Design of a scalable programming environment for large capacity computing in a large P2P grid environment," *IPSJ SIG Technical Report 2006*(87):115-120, Information Processing Society of Japan, Japan, Aug. 1, 2006.
Dean et al., "MapReduce: Simplified Data Processing on Large Clusters," Google, Inc., OSDI 2004, 2004, 13 pages.
Marozzo et al., "Adapting MapReduce for dynamic environments using a peer-to-peer model", 1$^{st}$ Workshop on Cloud Computing and its Applications, Oct. 23, 2008, retrieved from http://citeseerx.ist.psu.edu/viewdoc/download?doi=10.1.1.157.9239&rep1&type=pdf on Mar. 9, 2016, 7 pages.

* cited by examiner

Fig. 2C

Example Distributed Execution Monitoring Information

Program X Status Information at Time 2

| Node | Job | Status (% complete) | Node Disk I/O (MB/sec) & ID | Node Disk I/O % | Network I/O (Gb/sec) & ID | Network I/O % (ID) |
|---|---|---|---|---|---|---|
| A | J-A | 40% | 70 / J | 70% | 2.0 / R | 30% (R) |
| B | J-B | 35% | 20 / K | 20% | 1.0 / R | - |
| C | J-C | 30% | 08 / L | 80% | 1.0 / S | 18% (S) |
| D | J-D | 25% | 12 / M | 12% | 0.3 / T | 80% (T) |
| E | J-E | 55% | 10 / N (NSh) | 67% | 0.5 / T | - |
| F | J-F | 20% | 15 / L | 15% | 0.8 / S | - |
| Program X Total: | | 34% (Avg.) | 135 | 39% (Sh) | 4.6 / (R,S,T) | 43% (Avg.) |
| Program Y Total: | | 82% (Avg.) | 24 | 17% (Sh) | 8.6 / (R,U,V) | 72% (Avg.) |
| Program Z Total: | | 03% (Avg.) | 06 | 05% (Sh) | 9.2 / (V,W,X) | 87% (Avg.) |

...

Network Status Information at Time 2

| | I/O Capacity | I/O Usage | I/O % |
|---|---|---|---|
| Network R Total: | 10 Gb/sec | 8.7 Gb/sec | 87% |
| Network S Total: | 10 Gb/sec | 2.4 Gb/sec | 24% |
| Network T Total: | 1 Gb/sec | 0.9 Gb/sec | 90% |

...

Disk Status Information at Time 2

...

… (1) …

DYNAMICALLY MODIFYING A CLUSTER OF COMPUTING NODES USED FOR DISTRIBUTED EXECUTION OF A PROGRAM

CROSS-REFERENCE TO RELATED APPLICATIONS

This application is a continuation of co-pending U.S. application Ser. No. 13/620,805, filed Sep. 15, 2012 and entitled "Dynamically Modifying a Cluster of Computing Nodes Used for Distributed Execution of a Program," which is hereby incorporated by reference in its entirety. U.S. application Ser. No. 13/620,805 is a continuation of U.S. application Ser. No. 12/415,725, filed Mar. 31, 2009 and entitled "Dynamically Modifying a Cluster of Computing Nodes Used for Distributed Execution of a Program," now U.S. Pat. No. 8,296,419, which is hereby incorporated by reference in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). Such groups of interconnected computing systems are increasingly useful for various reasons, including to support increasingly large software programs and input data sets that may be distributed across multiple computing systems.

Various approaches have been taken to providing groups of interconnected computing systems. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 2A-2C illustrate examples of managing the monitoring and modifying of distributed program execution on multiple computing nodes.

DETAILED DESCRIPTION

Figure 1A:
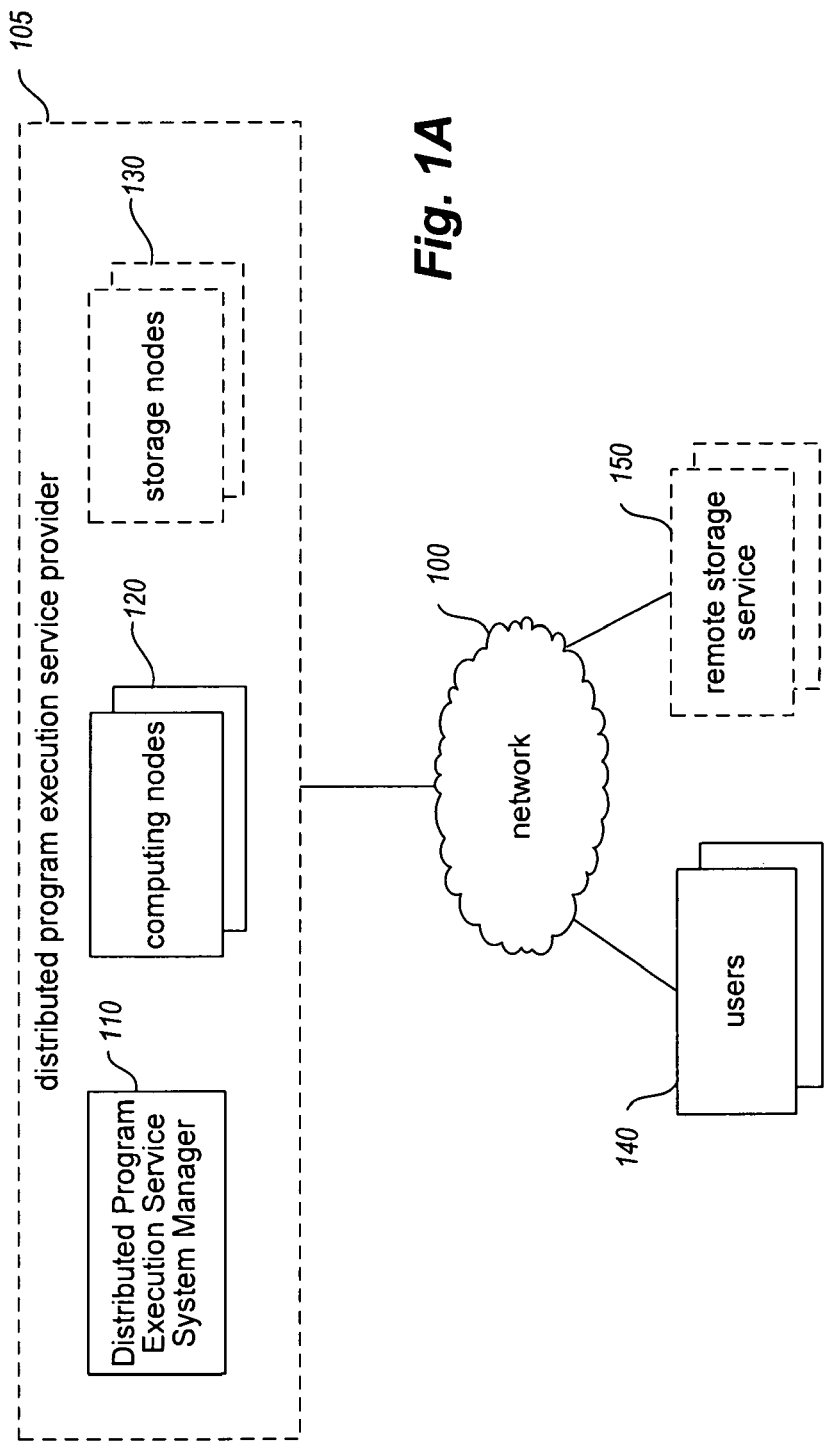
FIGS. 1A and 1B are network diagrams illustrating example embodiments of use of a distributed program execution service by remote users.

Techniques are described for managing distributed execution of programs. In at least some embodiments, the techniques for managing the distributed execution of a particular program include dynamically monitoring the ongoing distributed execution of a program on a cluster of multiple computing nodes, and dynamically modifying the distributed program execution in various manners based on the monitoring. The dynamic monitoring may include, for example, determining the status of execution of the program on each of the multiple computing nodes and/or determining the aggregate usage of one or more types of computing resources across the cluster of multiple computing nodes by the distributed program execution. The dynamic modifying of the distributed program execution may include, for example, adding and/or removing computing nodes from the cluster that is executing the program, modifying the amount of computing resources that are available for the distributed program execution, temporarily throttling usage of computing resources by the distributed program execution (e.g., if the distributed program execution is using more computing resources than allocated or otherwise expected, if one or more bottlenecks exist with respect to executing programs of other users), terminating or temporarily suspending execution of the program (e.g., if an insufficient quantity of computing nodes of the cluster are available to perform execution), etc. Additional details related to managing the distributed execution of programs are included below.

In addition, in at least some embodiments, some or all of the techniques may be automatically performed by embodiments of a Distributed Program Execution Service System Manager module, as described in greater detail below, such as a module that supports an embodiment of a distributed program execution ("DPE") service for executing multiple programs on behalf of multiple customers or other users of the service. In at least some embodiments, such a DPE service may provide various computing nodes (e.g., multiple physical computing systems and/or virtual machines that are hosted on one or more physical computing systems) with various computing resources (e.g., local memory, local storage, local CPU cycles, etc.) and other external computing resources (e.g., networks between computing nodes and to external computing systems, remote storage, etc.) for use in executing programs for users in a distributed manner. As described in greater detail below, the computing resources used to execute a particular program may include particular quantities of multiple types of computing resources (e.g., an aggregate amount of RAM or other memory of one or more physical computing systems that is used, such as by one or more computing nodes; an aggregate amount of network bandwidth capacity used on one or more networks, such as by one or more computing nodes; an aggregate amount of storage space used on one or more storage devices, such as by one or more computing nodes; etc.).

The dynamic monitoring of the ongoing distributed execution of a program on a cluster of multiple computing nodes may be performed in various manners in various embodiments. For example, in some embodiments and for some types of programs, a program may be separated into multiple execution jobs that are each executed on one of the computing nodes of the cluster, and one or more of the cluster computing nodes may further be selected as a master computing node that controls at least some aspects of the distributed execution of the program across the other computing nodes of the cluster. In such embodiments, the master node may gather some types of status information, such as from the execution jobs executing on other cluster computing nodes (e.g., a stage or phase of execution of an execution job, such as with respect to particular operations that are performed; an estimate of the amount of execution that has been performed and/or is remaining, such as measured by time or a percentage completeness; etc.), and if so the DPE service may automatically obtain some or all of that status information from the master node. In other embodiments, the DPE service may automatically gather other types of status information, such as directly from execution jobs executing on the cluster computing nodes, by interacting with manager modules of the DPE service that are local to various of the cluster computing nodes to determine status information for that computing node, etc.

Furthermore, in at least some embodiments, the dynamic monitoring may include automatically gathering information about various types of resource usage by the distributed execution of a program, such as resource usage specific to one or more particular cluster computing nodes that execute the program and/or aggregate resource usage from the distributed execution of the program across the entire cluster of computing nodes. The types of resource usage that are monitored and measured may vary in various embodiments, such as to include one or more of the following non-exclusive list, and may further be measured in absolute terms (e.g., a measured quantity of use) and/or in relative terms (e.g., a percentage used of the total available, to reflect the difference between an amount used by one program and the amount used by another program, etc.): network bandwidth capacity used, such as between two or more computing nodes of the cluster or more generally for any network resources used by the DPE service; disk I/O ("input/output") capacity used for a particular cluster computing node and/or for a particular hard disk or other storage device used by one or more cluster computing nodes; amount of volatile or non-volatile memory used; amount of non-volatile storage used; amount of CPU cycles used or other measure of CPU utilization; bus bandwidth capacity specific to a particular cluster computing node; etc. In addition, in at least some embodiments, the dynamic monitoring may further include automatically determining whether the execution of one or more programs by the DPE service is contributing to a bottleneck with respect to access of one or more types of computing resources for other programs, such as for other programs of the DPE service. Such bottleneck detection may be performed in various manners, including by detecting when usage of particular computing resources rises above predefined thresholds, by detecting when performance of one or more other programs are having their execution delayed or otherwise hindered due to lack of available computing resources, etc. Additional details related to dynamically monitoring the ongoing distributed execution of a program on a cluster of multiple computing nodes are included below.

In addition, the dynamic modifying of the ongoing distributed execution of a program on a cluster of multiple computing nodes may be performed in various manners in various embodiments, including in some embodiments and situations based on information obtained from dynamic monitoring activities (e.g., to reduce or eliminate bottlenecks). For example, in some embodiments and for some types of programs, the dynamic modifying may include automatically changing the multiple computing nodes of a cluster being used for distributed execution of a program while the distributed execution is ongoing, such as to expand the cluster during ongoing execution by adding one or more additional computing nodes and/or to shrink the cluster during ongoing execution by removing one or more of the computing nodes from the cluster. Cluster expansion may be performed, for example, to enable program execution to complete sooner, such as if execution on one or more cluster computing nodes is taking longer than expected, if execution of the program is being hindered by lack of sufficient computing resources and the additional computing nodes will provide access to additional computing resources that were lacking, if a master node or other cluster computing node has failed or otherwise become unavailable and the additional computing node(s) are configured to automatically take the place of the unavailable computing nodes, etc. Cluster shrinking may be performed, for example, to more efficiently use resources, such as if the distributed program execution is progressing faster than expected, if one or more cluster computing nodes are using too many computing resources and those computing nodes are shut down to throttle the excess computing resource usage, if one or more cluster computing nodes are not currently being used (e.g., have completed their portion of the distributed program execution and are removed from the cluster so as to be available for other uses and/or to prevent the ongoing distributed program execution from being responsible for ongoing fees for the computing node if it was part of the cluster), to remove all computing nodes from a cluster if a sufficient subset of the cluster computing nodes are not available for the ongoing execution (e.g., during an initial phase of the distributed program execution if a minimum percentage of cluster computing nodes and/or a minimum absolute quantity of cluster computing nodes have not completed their initialization and begun program execution within a predetermined period of time), etc.

Furthermore, in at least some embodiments, the dynamic modifying of the ongoing distributed execution of a program on a cluster of multiple computing nodes may include automatically adjusting resource usage by the distributed program execution in manners other than by expanding or shrinking the cluster of computing nodes. For example, in at least some embodiments, the usage of one or more types of resources by one or more cluster computing nodes may be increased or decreased in various manners, such as by interacting with a module of the DPE service that is local to those cluster computing nodes to temporarily or permanently expand or restrict access to one or more types of computing resources by the execution jobs of the program being executed on those computing nodes (e.g., to limit network bandwidth usage by restricting how many communications are allowed to be sent over the network on behalf of the program; to expand storage space available to the program by changing an amount of storage allocated to the program and/or by reducing the amount of storage on a shared storage device that is being used by one or more other programs; etc.). In addition, in at least some embodiments, resource usage by one or more cluster computing nodes for distributed execution of an indicated program may be modified in other manners, such as by directly interacting with the indicated program to indicate a change in resource usage limits that are in use by the indicated program, by reducing or expanding the amount of resource usage by one or more other programs that share one or more types of computing resources with the indicated program so as to correspondingly expand or reduce the amount of resources available to the indicated program, by moving portions of the distributed program execution within the computing nodes of the cluster (e.g., to balance computing resource usage if some cluster computing nodes are under-utilized with respect to one or more types of computing resources and other cluster computing nodes are over-utilized with respect to those types of computing resources, by moving computing-resource intensive portions of the distributed program execution to cluster computing nodes that are configured or otherwise specialized for that type of computing resource usage, etc.), by moving portions of the distributed program execution to different computing nodes outside the cluster (e.g., if the aggregate computing resource usage for distributed execution of an indicated program is high with respect to network bandwidth capacity but low with respect to other types of resource usage, changing the computing nodes of the cluster so that the total quantity stays the same but the new cluster computing nodes are located closer together within the network or are provided with access to network bandwidth that is not used by or is under-utilized by other programs), etc. Additional details related to dynamically modifying the ongoing distributed execution of a program on a cluster of multiple computing nodes are included below.

In addition, in at least some embodiments, the techniques may include managing the initial configuration to be used in the execution of an indicated program, including using configuration parameters such as a quantity of computing nodes and/or other measures of computing resources to be used for the executing. The distributed execution of a program may be initiated and configured in various manners in various embodiments, such as by a user interacting with an embodiment of a DPE service to request the execution of the program in a manner specified by the user. For example, the DPE service may provide a GUI ("graphical user interface") that a remote user interactively uses to make the execution request (e.g., a Web-based GUI with which a user interacts via a client application, such as a Web browser, executing on a client device of the user), and/or the DPE service may provide one or more APIs ("application programming interfaces") that enable a computing device and program of the user to programmatically interact with the DPE service to make the request (e.g., one or more APIs that are also used by the provided GUI). The user may specify various information as part of such a request, such as an indication of the program to execute (e.g., by supplying an executable copy of the program, by indicating a program previously registered by the user with the DPE service, by indicating a program made available by the DPE service for use by users, etc.), and an indication of input data for use by the executing program (e.g., by supplying the input data or by indicating an accessible location from which the input data may be obtained). An executable copy of a program may be supplied in various manners and formats, such as, for example, a Java ARchive ("JAR") file.

In addition, the user may further specify other configuration parameters for the distributed program execution in at least some embodiments, such as one or more of the following: an indication of a quantity of computing nodes to use for the requested execution; an indication of a type of computing node to use for the requested execution (e.g., if the DPE service provides different types of computing nodes with different capabilities, such as different amounts of memory, storage and/or processing power) and/or one or more other execution criteria to use in performing the requested execution (e.g., a user-specified QoS, or Quality of Service, level associated with the requested execution; an indication of a time by which the requested execution is to be completed; etc.); information about a location or layout of some or all of the computing nodes to use for the requested execution, such as relative to each other, to indicated data and/or to some other location (e.g., to be within a specified degree of geographical or network distance), or instead in an absolute manner (e.g., at a particular data center or other geographical location, within the boundaries of a country or other indicated geographical area, etc.); access information for use in communicating with one or more of the computing nodes, such as an SSH ("secure shell") key; configuration information for use in configuring a particular instance of the program for use with the requested execution; an indication of multiple execution jobs into which the indicated program execution is to be separated for parallel or other distributed execution, or instead an indication of how the DPE service is to automatically determine those multiple execution jobs (e.g., if the indicated program is designed to be separable in a defined manner into distinct execution jobs, such as based on an execution methodology used by or other design of the program); etc. More generally, in at least some embodiments, a user may be able to specify other more general high-level execution criteria (e.g., to complete execution as cheaply as possible within some indicated time period, to complete execution as quickly as possible with a specified maximum associated fee, to complete execution in a manner that attempts to optimize one or more other types of indicated factors, etc.), and the DPE service may automatically determine to provide preferred or otherwise appropriate execution configuration parameters to use to satisfy those execution criteria, as discussed in greater detail below. Furthermore, in at least some embodiments, the DPE service may further automatically determine some or all such configuration parameters for the distributed execution of a particular program, such as for use in warning a user if user-specified configuration parameters are sub-optimal or otherwise problematic (e.g., are insufficient to complete the execution by a desired time indicated by the user), or for otherwise recommending configuration parameters to the user. The automatic determining of such configuration parameters may be performed in various manners in various embodiments, such as based on the DPE service monitoring and assessing previous related program executions for various users that use differing configuration parameters (e.g., execution of the same program, such as for a program provided by the DPE service for use by users; execution of other programs of the same or similar type, such as that use the same design or execution methodology; etc.) in order to identify one or more preferred sets of configuration parameters for a particular program or particular program type. Additional details related to configuring the distributed execution of a program are included below.

The ongoing distributed execution of one or more programs for a user may also be tracked and modified in various manners in various embodiments, such as by a user interacting with an embodiment of a DPE service to modify ongoing distributed program execution in a manner specified by the user. For example, the DPE service may provide a GUI that a remote user may interactively use to view status information related to ongoing distributed program execution (e.g., based on dynamic monitoring of the ongoing distributed program execution that is performed by the DPE service, based on status information gathered by a master node that is controlling the program execution or otherwise provided by the program, etc.) and/or to make a distributed program execution modification request (whether the same GUI as used for configuring program execution or instead a distinct GUI), and/or may provide one or more APIs ("application programming interfaces") that enable a computing device and program of the user to programmatically interact with the DPE service to obtain such tracked information and make such modification requests (e.g., one or more APIs that are also used by the provided GUI for use in modifying execution). The types of distributed program execution modifications that may be initiated by a user may vary in various embodiments and situations, including to modify various previously specified configuration parameters for an distributed program execution (e.g., a quantity of computing nodes to use for the ongoing distributed execution), to suspend and optionally later resume some or all of the ongoing distributed execution, etc. Additional details related to modifying the ongoing distributed execution of a program are included below.

FIG. 1A is a network diagram that illustrates an example of a DPE service that manages distributed execution of programs for multiple users. For illustrative purposes, some examples and embodiments are described below in which specific types of management of distributed program execution are provided in specific manners. These examples are provided for illustrative purposes and are simplified for the sake of brevity, and it will be appreciated that the inventive techniques may be used in a wide variety of other situations, some of which are described in greater detail below. For example, while particular examples of how to monitor and modify the ongoing distributed execution of programs are described, other types of distributed execution and of monitoring and modifying may be used in other embodiments. In addition, while in some embodiments users initiate the execution of indicated programs in a distributed manner and/or modify the ongoing distributed execution of indicated programs, in other embodiments an embodiment of the DPE service may automatically initiate the execution and/or modification of such indicated programs and/or may determine to execute a program indicated by a user in a distributed manner (e.g., without knowledge of the user). Furthermore, in some embodiments at least some of the described techniques may be used with at least some programs that are not executed in a distributed manner, such as to configure, monitor and/or modify execution of such a non-distributed program.

In the example of FIG. 1A, a number of users 140 are interacting over a network 100 with an illustrated embodiment of a Distributed Program Execution Service System Manager ("DPE Service SM" or "DPESSM") module 110 to initiate distributed execution of programs on one or more computing nodes 120 that are available for executing programs of the users, such as a DPESSM module 110 that provides some or all of the functionality of a particular embodiment of a DPE service (not shown). The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the DPESSM module 110 and the computing nodes 120 are provided by a DPE service provider 105 as part of a DPE service, as well as one or more optional other storage nodes 130, and the DPESSM module 110 may execute on one or more other computing systems (not shown).

Figure 1B:
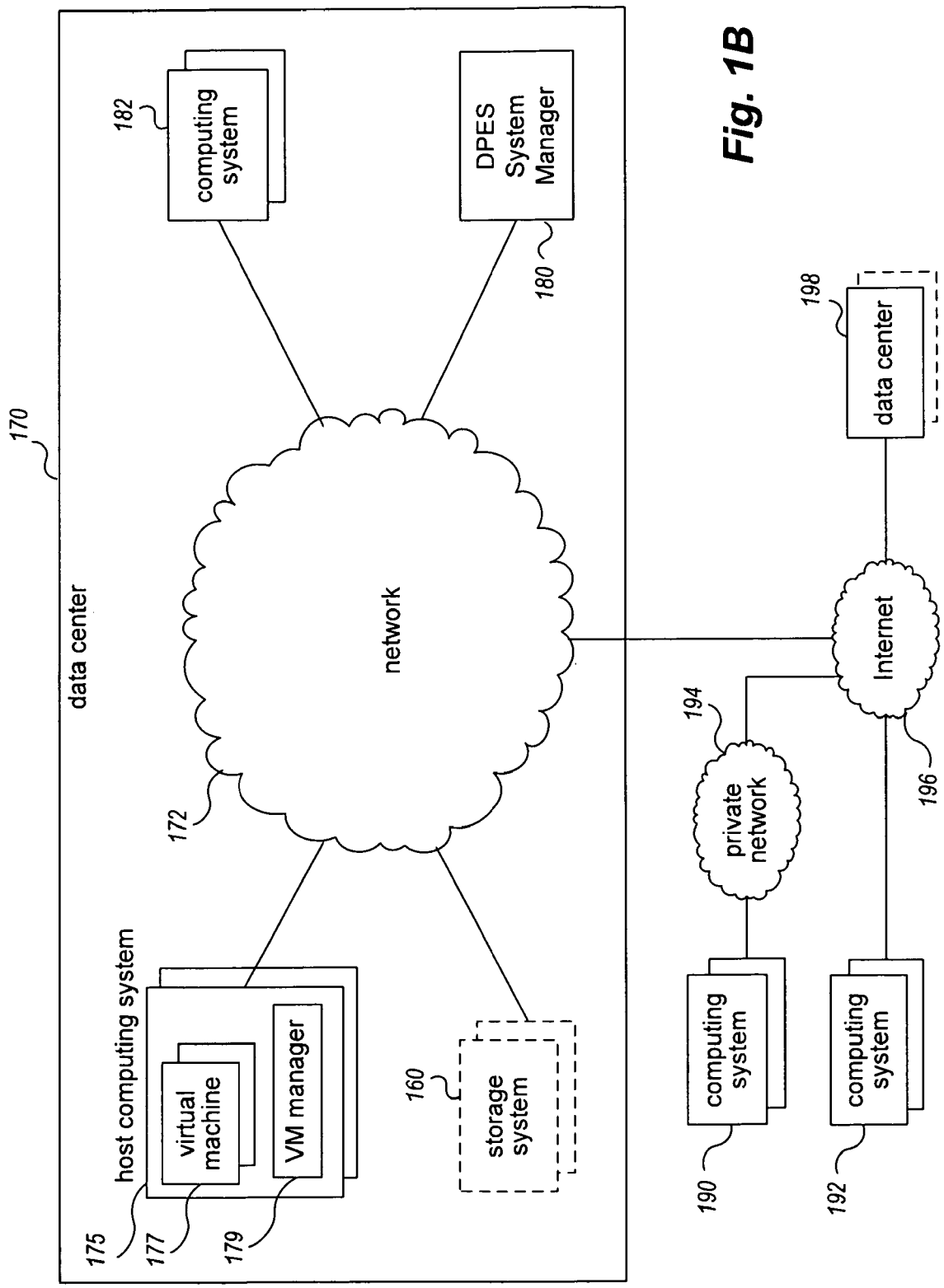

In some embodiments, the illustrated computing nodes 120 are provided by the DPE service provider 105 for distributed execution of programs on behalf of the users, and may include multiple physical computing systems and/or multiple virtual machines that are hosted on one or more physical computing systems (e.g., as is described in more detail with respect to FIG. 1B for one example embodiment). Each of the computing nodes 120 has some amount of computing resources available for executing one or more programs, such as may be measured, for example, by a combination of one or more of processing capacity (e.g., number and/or size of processing units), memory capacity, storage capacity, disk I/O ("input/output") capacity, etc., and other components (not shown) provided by the DPE service may provide other computing resources (e.g., network bandwidth capacity of one or more networks, additional storage capacity of network storage devices or other storage remote from particular computing nodes, etc.). In some embodiments, the DPE service provider 105 may provide preconfigured computing nodes, with each preconfigured computing node having similar and/or equivalent amounts of computing resources available for executing programs on behalf of users, while in other embodiments, the DPE service provider 105 may provide a selection of various different computing nodes, such as with different types or groups of computing nodes having varying amounts and/or types of computing resources (e.g., size, speed and/or type of processing units; number of processing units; amount of memory and/or storage; platform configuration, such as 32-bit or 64-bit; etc.).

In the illustrated embodiment, the various users 140 may interact with the DPESSM module 110 to make requests and specify various information. In various embodiments, such user requests and specifications may be made at various times, such as when a user registers to use services of the DPE service and/or at later times. For example, the DPESSM module 110 may provide subscription and/or registration services to one or more users, such that a user may specify information related to one or more programs to execute on behalf of the user (e.g., programs, source code, network addressable locations of one or more programs, etc.), account information (e.g., user name, billing information, etc.), terms of use, etc. In some embodiments, after a user interacts with the DPESSM module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the DPESSM module 110 may be provided to perform various operations related to subscription and/or registration services of the DPE service.

In addition, the users may interact with the DPESSM module 110 to initiate and configure execution of programs in various ways in various embodiments, such as by specifying a number and/or type of computing nodes for execution of programs, a minimum and/or maximum number of computing nodes to use, a preferred execution time and/or period of execution, an expiration time for the program execution request, a selection of one of multiple priorities for the execution (e.g., with associated fees that increase with increased priority), etc. Furthermore, in some embodiments, a user may interact with the DPESSM module 110 to request immediate execution of one or more programs on a specified number of computing nodes and/or to schedule such execution at one or more future times, such that the DPESSM module 110 may initiate the requested execution on the specified number of computing nodes at a specified time or when one or more specified criteria are satisfied (e.g., when it is determined that a specified number of computing nodes are available).

In this illustrated embodiment, the DPE service provides a variety of functionality for managing distributed execution of programs for multiple users on the computing nodes 120. For example, as previously noted, a particular user may use a GUI or API provided by the module 110 to submit a request for execution of an indicated program using indicated input data, optionally along with a variety of other types of configuration information. After the request for execution of the program is received, the DPESSM module 110 may select which of the available computing nodes 120 to use for the requested execution in various ways. For example, in some embodiments, the module 110 may simply select an appropriate quantity of computing nodes from any of the available computing nodes with sufficient resources, such as, for example, by randomly selecting from a pool of available computing nodes. In other embodiments, one or more specific computing nodes may be selected on the basis of one or more other factors, such as, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, etc. In addition, after the request is received, the module 110 may further determine how to separate the indicated program into multiple execution jobs to be executed on the multiple selected computing nodes, such as by using information supplied by the user and/or in an automatic manner based on previously obtained information about the design of the indicated program. Similarly, in at least some embodiments and situations, the module 110 may determine how to separate the indicated input data into multiple subsets for use by the multiple execution jobs. For example, in some situations, each execution job may include executing a full copy of the indicated program but on a particular subset of input data, while the other execution jobs similarly execute the full program copy functionality on other input data subsets. Alternatively, in some situations, various execution jobs may perform different functions on a single common set of input data.

As the execution jobs execute on the various computing nodes, the execution jobs store various information locally on the computing nodes in at least some embodiments. In addition, the DPE service may optionally provide one or more storage nodes 130 that are used by the DPE service to store information related to program execution and/or for other purposes. As discussed in greater detail elsewhere, such information stored on the storage nodes 130 may include status information regarding the intermediate state of partial execution of various execution jobs for various programs, and in some embodiments may optionally include output data that is generated by completed execution jobs.

Figure 2A:
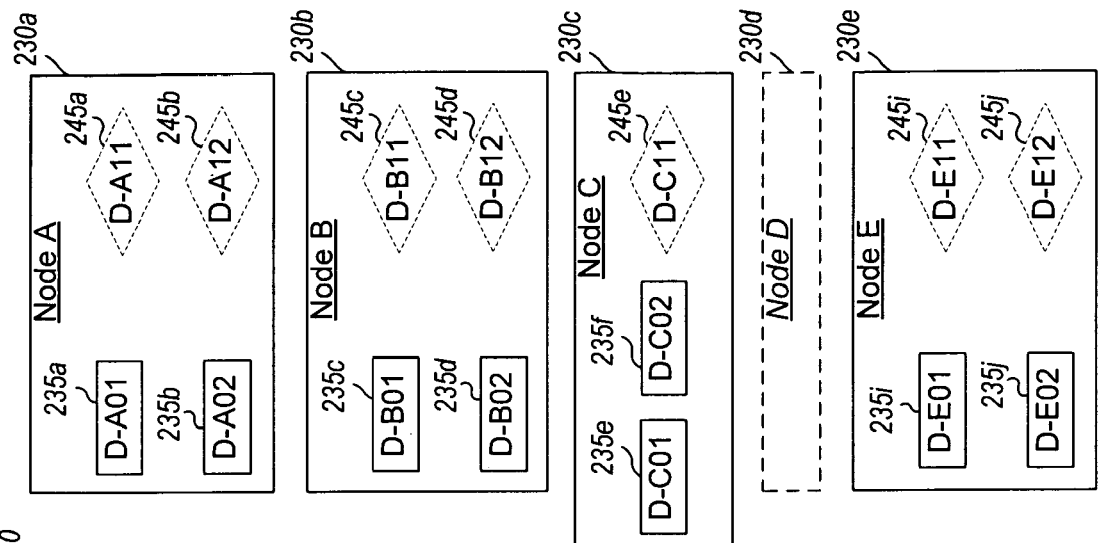
Figure 2A:
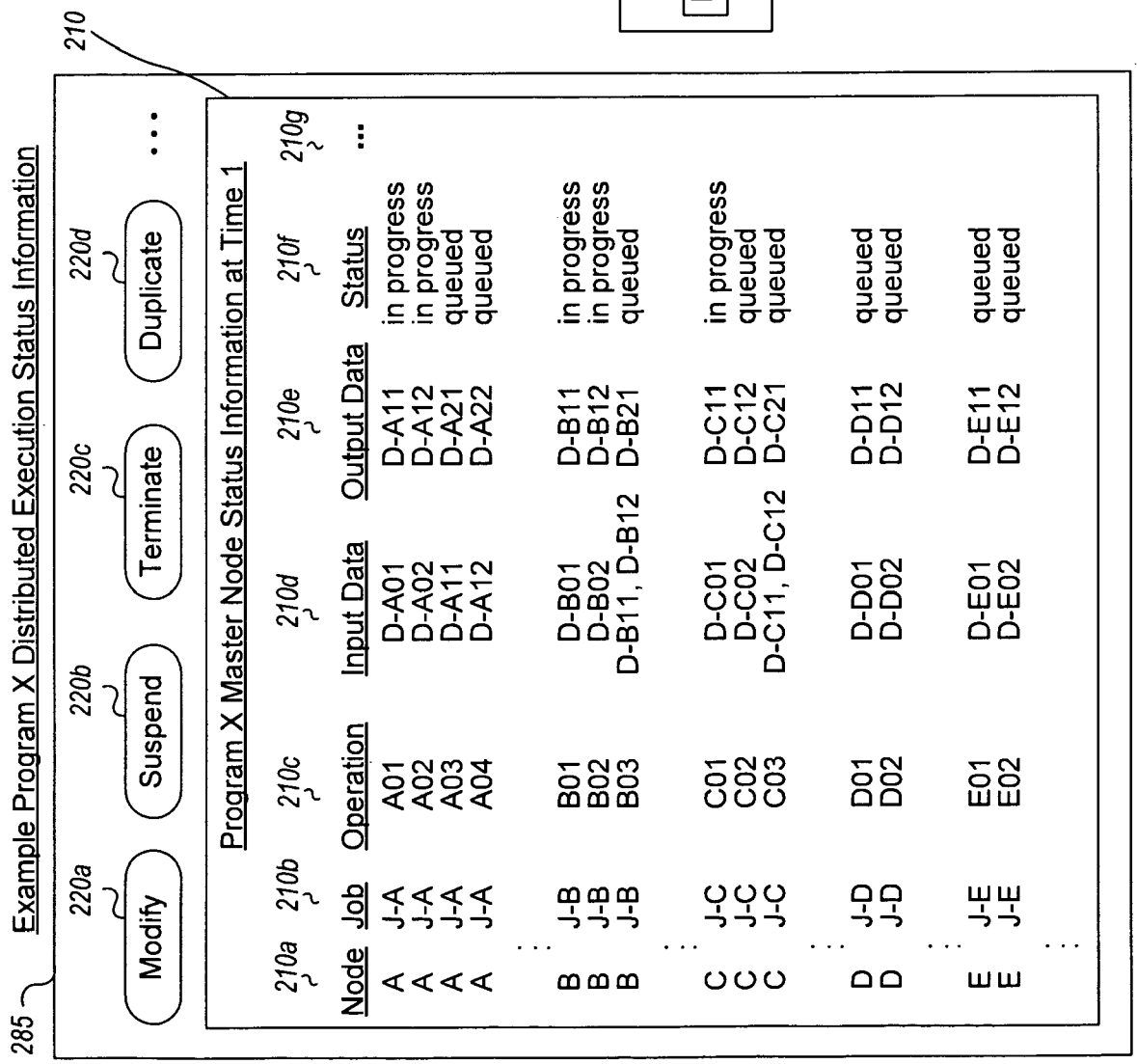
Figure 2B:
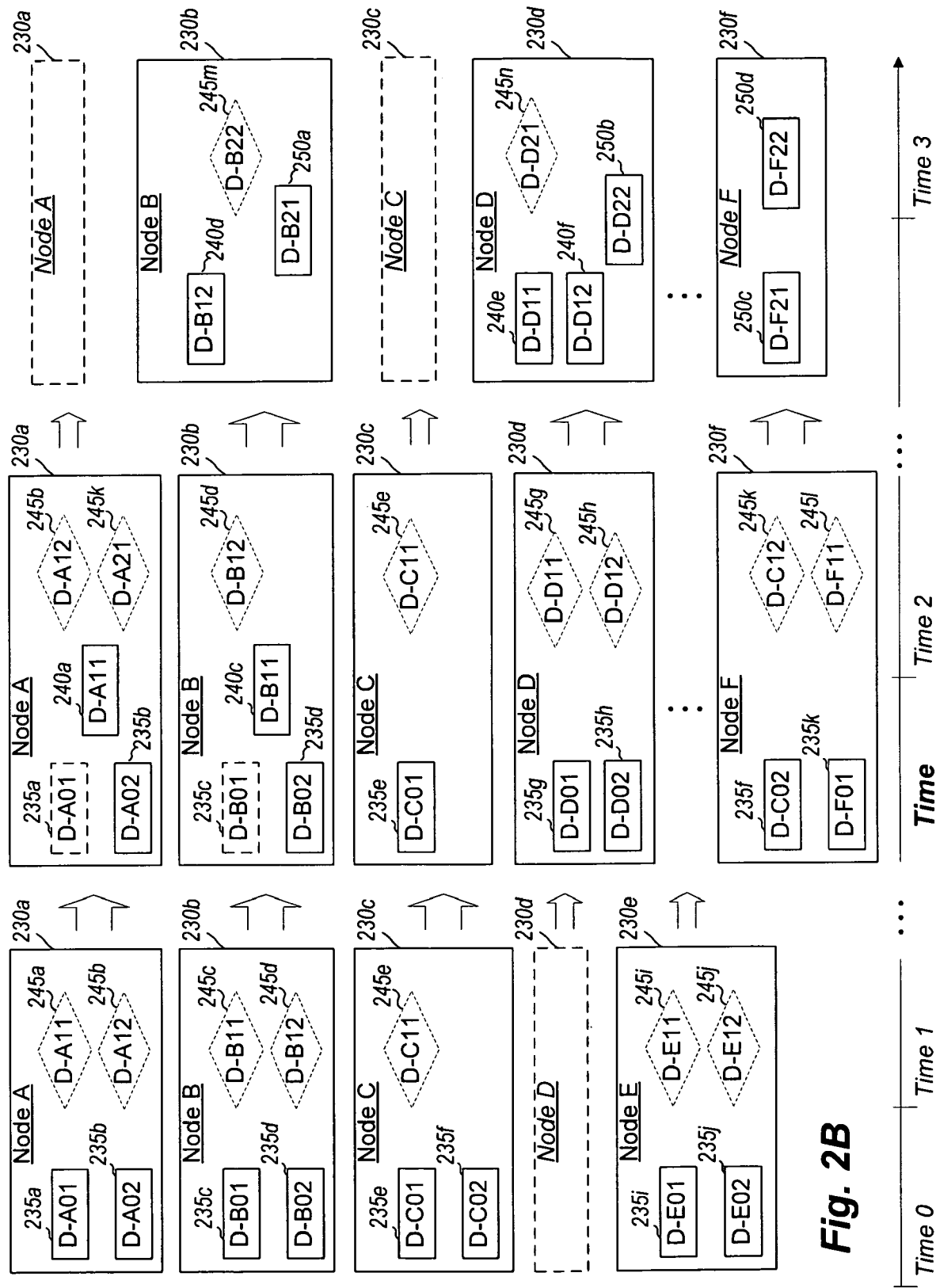

In addition, as the execution jobs of a program execute in a distributed manner on the various computing nodes of a cluster for that program, the DPE service may automatically perform various actions to dynamically monitor and/or modify the ongoing distributed execution of the program, with FIGS. 2A-2C illustrating examples of types of dynamic monitoring and modifying that may occur in some situations. For example, as discussed in greater detail elsewhere, the dynamic modifying of the ongoing distributed execution of the program on the multiple computing nodes of the cluster may include optionally performing various types of changes in certain situations, and the DPESSM module 110 may select which types of actions to pursue in which situations (e.g., based on predefined criteria specified generally for the DPE service, or specified specifically for the program being executed or other user on whose behalf the program is being executed). For example, if the DPESSM module 110 automatically determines to dynamically add and/or remove computing nodes from the cluster, the DPESSM module 110 may further select which computing nodes to add or remove, such as in a manner to the selections made initially by the module 110 in selecting particular computing nodes for the cluster. In addition, if the DPESSM module 110 automatically determines to make other types of changes to the ongoing distributed program execution, the DPESSM module 110 may similarly determine which types of changes to make (e.g., how to reduce bottlenecks corresponding to resource usage of the distributed program execution by altering the distributed program execution in one or more ways, such as by altering which execution jobs and/or input data are used by particular computing nodes, throttling resource usage on some or all computing nodes of the cluster, stopping the distributed program execution if sufficient cluster computing nodes are not available, etc.). Additional details related to the dynamic monitoring and modifying of ongoing distributed program execution are described elsewhere.

Furthermore, as discussed in greater detail elsewhere, in some embodiments the module 110 may provide indications to cause the intermediate state of partial execution of one or more execution jobs to be persistently stored before the partial execution of the execution job is temporarily terminated or otherwise suspended. Such intermediate state information for the partial execution may be stored in various manners remotely from the computing node on which the partial execution occurred, such as by copying such intermediate state information to one or more of the optional storage nodes 130 and/or by using one or more optional remote storage services 150 that are accessible over the network 100. In some embodiments, the module 110 coordinates the storage of the intermediate state information from the computing node to the remote persistent storage location, such as by using information that the module 110 tracks about the intermediate state of the partial execution, while in other embodiments the activities in performing the persistent storage of the intermediate state information may instead be performed by management software executing on the computing node to locally manage the execution of the execution job. Alternatively, if a particular executing execution job is able to store its own intermediate execution state, the module 110 may instead notify the execution job to perform its own intermediate execution state storage actions before shutting down its own execution. After the intermediate state of partial execution of an execution job has been persistently stored and the partial execution has been terminated, the partial execution may be resumed from that suspended intermediate state at a later time, such as substantially immediately (e.g., if the execution of the execution job is being moved from a first computing node to a second computing node, as quickly as the intermediate state information may be stored and retrieved), or instead after a longer period of time (e.g., at a later scheduled time, a later time when one or more specified criteria are satisfied, etc.). At the time of execution resumption, the stored intermediate state information may be retrieved from the persistent storage location, and locally stored on or otherwise made available to the computing node on which the execution job execution is to resume. In addition, the partial execution of the execution job may be resumed in various manners, such as by indicating to the execution job not to perform a subset of operations that were previously completed (e.g., if the execution job supports such functionality), by modifying the execution job to only perform a subset of the operations that were not previously completed, etc. Additional details related to the suspension and resumption of execution of execution jobs are described elsewhere.

FIG. 1B illustrates an embodiment in which a DPE service may be provided using one or more data centers that include multiple physical computing systems. In particular, FIG. 1B is a network diagram illustrating an example embodiment in which a DPESSM module 180 of a DPE service manages distributed execution of programs on behalf of users at an example data center 170. The example data center 170 is connected to the Internet 196 external to the data center 170, which in this example provides access to various external computing systems, such as computing systems 190 via private network 194 and other directly accessible computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the DPE service in at least some embodiments. For example, the distributed execution of a particular program may include simultaneous and/or sequential execution using computing nodes at multiple data centers or other distinct geographical locations, including to move execution of an execution job from a computing node at one geographical location to a computing node at another geographical location.

The example data center 170 includes a number of physical host computing systems 175, physical computing systems 182, optional storage systems 160, and a DPESSM module 180 of an embodiment of the DPE service. In this example, host computing systems 175 each provide multiple virtual machines 177 and have a virtual machine ("VM") manager module 179 to manage those virtual machines (e.g., a hypervisor or other virtual machine monitor), and some or all of the computing systems 182 may similarly have one or more such virtual machines and/or VM manager modules (not shown). Such virtual machines may each act as a computing node for use by the DPE service, and a VM manager module on a host computing system provides one example of a type of module that the DPE service may use to dynamically monitor the host computing system (e.g., to obtain status information about one or more of the virtual machine computing nodes hosted by that host computing system) and/or to dynamically modify ongoing distributed program execution on one or more of the virtual machine computing nodes hosted by that host computing system (e.g., by throttling computing resources used by one or more of the hosted virtual machine computing nodes, by changing computing resources allocated to or otherwise available to one or more of the hosted virtual machine computing nodes, etc.). Alternatively, in other embodiments, some or all of the physical host computing systems at the data center may not provide any virtual machines, such as to instead act as a computing node that directly executes one or more programs on behalf of end user customers of the DPE service, and such other host computing systems may similarly execute a module of the DPE service that monitors and/or modifies distributed program execution in which that host computing system participates. In addition, in some embodiments, the physical host computing systems 175 and/or physical computing systems 182 may each include management software (e.g., a management module of the DPE service, such as part of or distinct from the VM manager modules) to manage the execution of execution jobs on the computing systems, whether as part of or instead distinct from the DPE service module that performs the dynamic monitoring and/or modifying. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, one or more such factors may further be used as constraints and/or preferences regarding which computing systems to select for executing particular programs. The optional storage systems 160 may also have various forms, such as computing systems with attached storage (e.g., that may also be used as computing nodes at times), network storage devices that are not used as computing nodes, etc. The example data center 170 further includes an internal network 172 that may include multiple networking devices (not shown), such as switches, edge routers, and core routers, with computing systems 175 and 182, storage systems 160, and the DPESSM module 180 connected to the internal network 172.

The illustrated DPESSM module 180 performs at least some of the described techniques in order to manage distributed execution of programs using the computing systems 175 and 182, and to optionally persistently store at least some program execution results on storage systems 160. For example, the DPESSM module 180 may provide a GUI or other functionality that enables remote users to configure distributed program execution and/or to track and optionally modify ongoing distributed program execution, such as for users (not shown) of computing systems 190 or 192 or at one of the other data centers 198. When a particular computing node or system is selected to execute one or more execution jobs of a program, the DPESSM module 180 may in some embodiments initiate execution of the execution jobs by interacting with a VM manager module or other manager module that controls execution of programs for that selected computing node/system, or may alternatively directly execute the execution jobs on the selected computing node/ system. The DPESSM module 180 may further in some embodiments take various actions to dynamically monitor and/or modify the ongoing distributed execution of various programs executing on the computing nodes of the data center 170 that are used by the DPE service. In addition, some of the computing systems 190 or 192 or at one of the other data centers 198 may be used to provide one or more network-accessible remote storage services (not shown) that are accessible by the DPE service and used to persistently store at least some intermediate results or other information.

It will be appreciated that the data center of FIG. 1B is provided for illustrative purposes only, and that an embodiment of a DPE service and other software execution services may be provided in other manners in other embodiments. For example, DPESSM module 180 may instead be provided using one or more other computing systems external to the data center 170, such as computing systems 190, 192 or at a data center 198. In addition, in at least some embodiments, the programs for which distributed execution is provided may include executable software images, such as virtual machine images that are bootable or otherwise loadable on one or more virtual machine computing nodes, and that each may include operating system software, software for one or more application programs, and/or configuration information, etc. At least some such programs may be stored by the DPE service and/or by users on the storage systems 160 and/or using a remote storage service, and if so are retrieved by or supplied to the DPE service when they are to be executed on behalf of a user or as otherwise initiated. Furthermore, while only a limited number of devices are illustrated in this example, it will be appreciated that in a typical arrangement, data center 170 may include hundreds or thousands of host computing systems such as those illustrated here, organized into a large number of distinct physical networks with a large number of networking devices (e.g., in a hierarchical manner).

As previously noted, FIGS. 2A-2C illustrate examples of types of dynamic monitoring and modifying that some embodiments of a DPE service may perform to manage the ongoing distributed execution of indicated programs.

In particular, FIG. 2A illustrates various example status information 210 that corresponds to the ongoing distributed execution of an example program, Program X, at a particular time, Time 1. In the example of FIG. 2A, a cluster of computing nodes 230 are participating in the distributed execution of Program X, as discussed in greater detail with respect to FIG. 2B, and one or more other computing nodes (not shown) may also be part of the cluster and acting as master computing nodes to control various actions of the cluster computing nodes 230. The status information 210 may reflect status information that is gathered by automatic monitoring by an embodiment of the DPE service (not shown) and/or by one or more of the master computing nodes. The status information 210 may be stored and used in various manners, and in some embodiments may be used by the DPE service in automatically modifying the distributed execution of Program X.

In the example of FIG. 2A, the status information 210 is displayed as part of a GUI screen 285 that also includes various user-selectable controls 220. Such a GUI may be displayed to, for example, a human operator user of the DPE service, and/or a user of the DPE service who initiated the distributed execution of Program X. In this example, the user-selectable controls 220 include a "Modify" control 220a via which the user may supply instructions to modify the ongoing distributed execution of Program X in one or more manners as specified by the user (e.g., to add or remove computing nodes from the cluster, to modify computing resource usage of Program X, etc.). In addition, in this example, the user may use the "Suspend" control 220b to temporarily suspend the ongoing in-progress distributed execution of Program X, the "Terminate" control 220c to permanently terminate the ongoing in-progress execution of Program X, and the "Duplicate" control 220d to initiate execution of a new program by duplicating at least some of the specified configuration information of a selected program via control 220b. In some embodiments, other controls may be available, such as a "Resume" control (not shown) to resume the execution of a previously suspended program, whether immediately or at an indicated future time. It will be appreciated that other types of controls may be displayed in other embodiments, and that controls may be displayed and used in various manners in various embodiments.

In this example, the status information 210 includes various execution state information regarding the distributed execution of Program X, such as to track the status of execution of execution jobs on the multiple computing nodes used for the distributed execution. In particular, in this example, the example time of Time 1 reflects a time that is shortly after distributed execution of Program X has been initiated (e.g., 10 minutes), and thus the distributed execution of Program X is not yet fully using the cluster computing nodes 230. In particular, computing node Node D 230d has not yet begun executing any execution jobs for Program X, such as if Node D is still being initialized for Program X (e.g., is still obtaining input data to be used, is still obtaining software code corresponding to one or more execution jobs of Program X to be executed on Node D, is still configuring the Program X software code before execution begins, is still establishing access to the master node and/or to other cluster computing nodes 230, etc.), or has encountered one or more problems (e.g., a failure or other unavailability, a bottleneck caused by another executing program, etc.). Computing node Node E 230e is similarly not yet executing any execution jobs for Program X, but has just completed its initialization process, and is ready to be executing its allotment of Program X execution jobs. The other 3 computing nodes 230 that are included in the initial cluster for Program X have already begun their respective portions of the distributed execution of Program X at Time 1, with those other nodes being Node A 230a, Node B 230b, and Node C 230c.

In addition, in this example, each line or entry in the information 210 corresponds to the performance of a particular operation for a particular execution job on a particular computing node, with information being tracked that in this example includes an identification 210a of the computing node, of the execution job 210b, of the operation 210c, of the status of performance 210f of the operation, of input data 210d to be used by the operation, of output data 210e to be produced by the performance of the operation, and optionally of various other information 210g. Such other status information may include, for example, information about dependencies or other inter-relationships between operations (e.g., operation B cannot be executed until after operation A is completed, operations C and D are to be executed simultaneously, etc.), information about expected completion of performance of an operation being performed (e.g., an expected completion time, an expected amount of time until completion, a percentage completion of an operation, a percentage of the operation that remains to be performed, etc.), information about expected initiation of performance of operations that are not yet being performed, etc. Various other types of information may similarly be displayed for Program X, such as information about the one or more master nodes that control execution of the execution jobs on the various cluster computing nodes 230 and that may optionally gather and store various status information for the distributed execution, a graphical depiction of some or all of the various multiple computing nodes, etc.

While not illustrated in this example, in some embodiments and situations, different users or other entities may be involved in different parts of the distributed execution of a program, such as to have a first user initiate distributed execution of a program, a second user initiate a first suspension of execution of that program, a third user initiate a first resumed execution of that program, etc. Such two or more different users may, for example, represent a single entity, not represent the same entity but be affiliated in one or more other manners (e.g., based on working together), have authorization that has been granted to perform specified actions for other users, etc.

In the example of FIG. 2A, the execution of an example execution job J-A has been initiated on computing node Node A. Execution job J-A includes operations to be performed in this example that include at least example operations A01, A02, A03, and A04, and the first four entries in the status information 210 correspond to these operations for this execution job and computing node. In this example, operations A01 and A02 have begun and are in progress, with operation A01 using input data D-A01 and with operation A02 using input data D-A02. The graphical indications of cluster computing nodes 230 are provided in FIG. 2A for illustrative purposes to indicate information about the current status of the computing nodes, but are not displayed as part of the GUI screen 285 in this example. In particular, the graphical display of Node A 230a indicates the input data D-A01 235a and D-A02 235b that are currently loaded on Node A and being used, as well as indications 245a and 245b of output data for operations A01 and A02 that are in the process of being produced. In particular, operation A01 will produce output data D-A11 245a, which operation A03 uses as input data—since that data D-A11 245a is not yet available, operation A03 is queued to be executed while Node A is waiting for that data to be available (and optionally for sufficient computing resources to be available on Node A to execute the operation). Similarly, operation A02 is in progress and is using input data D-A02 to eventually produce output data D-A21, and since operation A04 uses that output data D-A12 as input data, operation A04 is similarly queued and ready to be executed when its input data and Node A are available to perform it. Similar status information is illustrated for other computing nodes, execution jobs and operations.

FIG. 2B continues the example of FIG. 2A, and in particular illustrates the changing status of the distributed execution of Program X over time. In particular, the left portion of FIG. 2B corresponds to Time 1, and thus the graphical depictions of the computing nodes 230 match those shown in FIG. 2A at the same time. As discussed in greater detail elsewhere, in some embodiments the distributed execution of Program X may be stopped at Time 1 or a prior time, such as if the 3 example computing nodes that have begun executing portions of Program X just prior to Time 1 (those being Node A, Node B and Node C) are not determined to be a sufficient quantity or percentage of the cluster computing nodes (e.g., less than 90% participating in the distributed execution of Program X within 10 minutes of the Time 0 initialization time for the Program X distributed execution).

In the illustrated example, however, the distributed execution of Program X is not stopped (or is stopped but is later resumed or restarted prior to Time 2), and the status of the distributed execution of Program X at Time 2 is illustrated in the center of FIG. 2B. In this example, the progression of the distributed execution on the various cluster computing nodes 230 has progressed. For example, with respect to Node A, operation A01 has now been completed, as reflected by the output data D-A11 240a as being shown as now being stored on Node A, and further being used as input for the now in-progress performance of operation A03 that is in the process of generating additional output data D-A21 245k. Since input data D-A01 has now been used, it may optionally have been removed from Node A, and operation A02 is continuing to be performed and in the process of generating output data D-A12 245b. The other computing nodes have similarly progressed in their distributed execution of Program X, including that Node D and Node E are both now participating in the distributed execution of Program X.

However, some modifications have been automatically made to the ongoing distributed execution of Program X since Time 1 in this example. In particular, Node C has experienced slower performance than expected (e.g., based on Node C having less available computing resources as compared to other cluster computing nodes 230; based on a bottleneck being created on a host physical computing system, not shown, that provides Node C, such as by another computing node provided by that host physical computing system as part of the distributed execution of another program; etc.), and the overall distributed execution of Program X may be taking longer than expected (e.g., based solely on the unexpected delay with respect to Node C, based on unexpected slowness of one or more cluster computing nodes 230 other than Node C; etc.). Accordingly, the DPE service has automatically added a new computing node Node F 230f to the cluster, and in this example has distributed a portion of the Program X operations that were previously assigned to Node C to now be performed by Node F. In particular, Node C continues to perform the operation C01, as was previously occurring at Time 1, but operation C02 has been transferred to Node F and is currently being performed by Node F (as demonstrated by the input data D-C02 235f being loaded on Node F and the output data D-C12 245k being in the process of being generated on Node F by operation C02). Node F also in this example is executing one or more other operations that were not previously assigned to any of the computing nodes 230a-230e at Time 1, such as operation F01 (not shown) that uses input data D-F01 235k and is in the process of generating output data D-F11 245f.

FIG. 2B further illustrates the status of the distributed execution of Program X at a later Time 3, which is illustrated on the right side of FIG. 2B. In the illustrated example, much of the distributed execution of Program X has been completed, and the DPE service is gradually ramping down the ongoing distributed program execution. In particular, at Time 3, Node A and Node C have completed the portions of the distributed execution assigned to them (both the initial assignments, and any later assignments). Accordingly, while other cluster computing nodes 230 continue the ongoing distributed execution of Program X, the DPE service has automatically shrunk the cluster at Time 3 to no longer include Node A and Node C. Thus, in this manner, the DPE service may automatically modify the ongoing distributed execution of Program X and the corresponding cluster used for that distributed program execution at various times and for various reasons.

FIG. 2C continues the examples of FIGS. 2A and 2B, and in particular illustrates additional status information regarding the ongoing distributed execution of Program X, as well as other programs by the DPE service. In this example, status information 290 and 291 is shown that indicates status at Time 2, such as may be automatically gathered by automatic monitoring activities of the DPE service. In addition, the status information 290 and 291, as well as other status information 292 and 293, may be part of a GUI screen 295 that is displayed to one or more users in a manner similar to that previously discussed with respect to FIG. 2A, although no user-selectable controls are illustrated in the example of FIG. 2C, and/or the various status information may be used internally by the DPE service as part of automatically determining automatic modifying to perform for the distributed execution of Program X.

In the example of FIG. 2C, various status information 290 has been monitored regarding the distributed execution of Program X at Time 2, and in particular shows aggregate computing resource usage information for Program X at Time 2. In particular, in this example, each line or entry in the information 290 corresponds to a particular one of the cluster computing nodes 230, with information being tracked that in this example includes an identification 290a of the computing node, of one or more corresponding execution jobs 290b being executed on that computing node, of the status of performance 290c of the execution job(s), and various computing resource usage information 290d-290h. The example computing resource usage information that is shown in this example includes a quantity 290d of disk I/O for an indicated hard disk that the computing node is using (e.g., an average over a prior period of time, a current point-in-time value, etc.) and a percentage 290e of the total disk I/O for that indicated hard disk that the computing node is using, a quantity 290f of network bandwidth I/O for an indicated local network that the computing node is using (e.g., an average over a prior period of time, a current point-in-time value, etc.) and a percentage 290g of the total network bandwidth capacity for that indicated network that the computing node is using, etc. Various other types of computing resource usage information 290h may similarly be shown, and it will be appreciated that the various types of computing resource usage information may be displayed in various manners in various embodiments.

In addition to the computing resource usage data for the distributed execution of Program X that is shown for each of the cluster computing nodes 230, the bottom of the status information 290 also shows aggregate computing resource usage information for the entire distributed execution of Program X. For example, the illustrated data includes a total quantity 290d of disk I/O used by all of the cluster computing nodes 230, an average percentage 290e of the total disk I/O used by all of the cluster computing nodes 230, a total quantity 290f of network bandwidth I/O used by all of the cluster computing nodes 230, and an average percentage 290g of the total network bandwidth capacity used by all of the cluster computing nodes 230. In this example, most of the hard disks and networks being used by the cluster computing nodes 230 are shared computing resources used by other computing nodes (e.g., other computing nodes 230 of the same cluster, other computing nodes of other clusters that are executing other programs, etc.), although example hard disk N used by Node E is not shared ("NSh") by others (e.g., is a remote logical network disk that is used only by Node E), and thus in this example the usage of that non-shared computing resource is not included in the aggregate computing resource usage information. In other embodiments, all computing resources may be shared or may be not shared, and the aggregate information may or may not include both types of computing resource usage information.

In addition to the status information 290 illustrated for the ongoing distributed execution of Program X, FIG. 2C also illustrates other status information 291 corresponding to the ongoing distributed execution of other programs of the DPE service, although only aggregate computing resource usage information is shown for these other example programs. Furthermore, FIG. 2C also illustrates various status information 292 from monitoring the total usage of networks of the DPE service by the various programs being executed, and may similarly include status information 293 from monitoring the total usage of hard disks by the various programs of the DPE service being executed, as well as optionally other types of computing resource usage.

The various status information of FIG. 2C may be used in various manners, including by the DPE service as part of automatically determining whether to modify ongoing distributed execution of one or more programs of the DPE service. For example, with respect to the ongoing distributed execution of Program X, the usage of disk J (by Node A, at 70% of the total disk I/O) and aggregate usage of disk L (by Nodes C and F, at an aggregate 95% of the total disk I/O) may exceed an allocation or other expected usage for shared disks, and thus may create a bottleneck for any other programs that are attempting to use those disks. As such, the DPE service may determine to take various actions, such as to throttle the usage of those disks by those computing nodes (e.g., of the usage by one or both of Nodes C and F of disk L), or to take other actions to accommodate the actual or potential bottleneck (e.g., temporarily prevent any other computing nodes from using disk L, so that the aggregate 95% total disk I/O that is being used by Program X does not create any actual bottlenecks for other programs). In other embodiments and situations, the DPE service may not take action until an actual bottleneck arises—for example, if other computing nodes are not attempting to use 30% or more of the total disk I/O for disk J, then Node A's use of 70% of the total disk I/O may be allowed until additional disk J I/O capacity is needed by other computing nodes. Similarly, with respect to network bandwidth usage, the aggregate use of network T by Nodes D and E is 80% of the total network bandwidth capacity, and another 10% is being used by one or more other programs (as shown in the I/O capacity 292a, I/O usage 292b and I/O % 292c of status information 292). Accordingly, such network T usage by Nodes D and E may be throttled due to the potential or actual bottleneck caused by the use of network T for the distributed execution of Program X. As another alternative, one or both of Nodes D and E may be automatically determined by the DPE service to be replaced or supplemented by one or more other computing nodes to be added to the cluster for Program X that are part of other local networks of the DPE service, such network T has relatively low total bandwidth capacity compared to other networks of the DPE service (e.g., network S with ten times more bandwidth capacity and a current total bandwidth usage of 24%).

It will be appreciated that the illustrated and other types of status information may be automatically monitored by the DPE service in various manners, and may be automatically used by the DPE service in determine modifications to make to ongoing distributed execution of programs. In addition, it will be appreciated that the information in the examples of FIGS. 2A-2C has been provided for illustrative purposes only, and various details have been shown in an abstract manner or not illustrated for the sake of understanding.

Furthermore, it will be appreciated that while only a limited number of computing nodes and execution jobs have been illustrated, in actual embodiments the actual quantities may be much larger, such as to include hundreds or thousands or millions of computing nodes and/or execution jobs.

As previously noted, the DPE service may provide various functionality to perform distributed execution of programs for users. For example, after program execution is requested or otherwise initiated, whether by a user or in another manner, that program execution may be separated into multiple execution jobs for parallel or other distributed execution in various manners in various embodiments. For example, as previously noted, the program may be designed to be separable in a defined manner into distinct execution jobs (e.g., to support task-level parallelism), and if so a user may indicate how to generate multiple execution jobs and/or the DPE service may automatically generate the multiple execution jobs. Furthermore, some types of programs may perform various operations on each of a number of pieces of input data, and in such situations, data parallelism techniques may be used to separate the group of input data for use in the program execution into multiple subsets that are each supplied to a distinct execution job (e.g., with each execution job performing some or all of the same operations on the input data subset used for that execution job). As one simple example, a particular program execution may include searching a large number of Web pages for two particular terms (or alternatively indexing the Web pages for use in later searches), and the program execution may be separated into a large number of execution jobs that execute simultaneously in parallel to each search (or index) a distinct subset of the Web pages (e.g., a single Web page, or a small number of the Web pages) for one or both of the terms. Non-exclusive examples of types of programs that may be separated into multiple execution jobs (e.g., to support task parallelism and/or data parallelism) include the MapReduce program for processing and generating large data sets, the Hadoop program implementation of MapReduce execution methodology, the Hive data warehouse infrastructure that uses Hadoop, the Pig structured query language for use with HDFS ("Hadoop Distributed File System") data, the HBase open-source distributed database, various types of image, video and speech processing, various types of analysis of and searching through textual data sets or other types of input data, etc. Additional details related to the MapReduce program are included in "MapReduce: Simplified Data Processing on Large Clusters" by Jeffrey Dean and Sanjay Ghemawat, December 2004, Proceedings of OSDI'04: Sixth Symposium on Operating System Design and Implementation, available at the time of application filing at labs<dot>google<dot>com<slash>papers<slash>mapreduce-osdi04.pdf (where "<dot>" and "<slash>" are replaced with corresponding characters "." and "/"), which is incorporated herein by reference in its entirety.

In addition, in at least some embodiments, the tracking and other dynamic monitoring of the ongoing distributed execution of a program may include monitoring some or all execution jobs for the program, such as to determine when particular execution jobs begin execution and complete execution. Such monitoring of the execution of execution jobs may provide various benefits, such as to determine when to later initiate execution of other execution jobs (e.g., if the output data generated by a first execution job is at least some of the input data for a second execution job, so as to assist in determining when to execute the second execution job), and/or to determine when all execution jobs of a program have been completed. Furthermore, in at least some embodiments, some or all execution jobs may each have multiple distinct operations (which also may be referred to as "tasks" in some situations) that are to be performed, such as in a sequential and/or parallel manner, and the monitoring or other tracking of the ongoing execution of such execution jobs may further include determining information about the status of the partial performance of some or all such operations, such as to reflect intermediate data that is generated by completed performance of some such operations. Such tracking of the performance of particular operations for an execution job may further provide various benefits, such as to enable the ongoing intermediate execution and data state from the partial execution of the execution job to be tracked and used, as described in greater detail below. The monitoring may include using a system manager module to initiate execution of execution jobs on particular computing nodes, and to subsequently obtain status information from the computing nodes (e.g., by the system manager module pulling status information from the computing nodes, such as by periodically requesting status information from each computing node, and/or by the computing nodes pushing status information to the system manager module, such as periodically or when particular events occur).

When executing an execution job for a program on a computing node, various information related to the execution may be stored in various manners. For example, when the execution is initiated, the input data to be used by the execution job may be locally stored on the computing node (e.g., on a local hard disk or other local storage device) to facilitate access to that input data during execution, and any software instructions to be executed for the execution job may similarly be locally stored on the computing node. Such information to be locally stored may be supplied to the computing node under control of the system manager module of the DPE service, such as from a highly available long-term storage location for the DPE service that is remote from the multiple computing nodes used to execute the program (e.g., a long-term storage location that is available from a network-accessible remote storage service). In addition, after the execution of the execution job is completed and any output data from the execution is generated, that output data may similarly be locally stored on the computing node, such as temporarily until that output data is copied back to the long-term storage location for the DPE service for use by other execution jobs or otherwise in generating the final output results for the execution of the program. After the execution of the execution job of the program is completed, the local storage on the computing node may in some embodiments be erased or otherwise cleared after any output data from the execution is copied back to the DPE service's long-term storage location, such as in preparation for or as part of initiating execution of another execution job on the computing node (e.g., another execution job of a different program for a different user). In other embodiments, the local storage on the computing node may instead be maintained even after the execution of an execution job is completed (e.g., until execution of the program is complete).

Furthermore, in at least some embodiments, various intermediate output data and other intermediate results from the partial execution of an execution job on a computing node may be temporarily stored locally on the computing node during the execution, such as to correspond to output data produced by a subset of the operations of the execution job whose performance is completed, and/or to correspond to partial or incomplete output data produced by one or more operations whose performance has been initiated but not completed. In at least some embodiments in which a long-term storage location of the DPE service is used, such intermediate results are not stored on the DPE service's long-term storage location (e.g., to minimize execution delay and network traffic involved in copying such intermediate results to the DPE service's long-term storage location), while in other embodiments some or all such intermediate results may be stored on the DPE service's long-term storage location.

As one example of intermediate results, referring back to the prior simplified example of an execution job that involves searching through multiple Web pages for two terms, each operation of the execution job may correspond to searching through a single Web page for a single term, with the intermediate output data from performance of such an operation being information about any occurrences of that term in that Web page (e.g., a cumulative number of times that the term is located; information about each occurrence of the term in that Web page, such as its location in the Web page; etc.). Alternatively, as another example, a particular execution job may involve searching through a Web log or other transaction record that has numerous entries (e.g., with each line in the Web log representing an entry) for a particular term, and each operation of the execution job may involve searching a particular input data entry for that term, with the intermediate output data from performance of such an operation similarly including information about whether the input data entry includes the term.

By storing the output data from the completed execution of an execution job in the DPE service's long-term storage location, the availability of that output data may be maintained even if a particular computing node subsequently fails or otherwise becomes unavailable. However, if intermediate results from partial execution of an execution job are not stored on the DPE service's long-term storage location, a termination of the execution of that execution job before completion may result in those intermediate results being lost, such that the execution job would need to later be executed again from the beginning (e.g., to repeat performance of all operations of the execution job, even if some of the operations were previously completed). Accordingly, distributed execution of a program is managed by the DPE service in at least some embodiments in such a manner as to store and use such intermediate results from partial execution of an execution job that is temporarily terminated or otherwise suspended before completion, so that a later resumption of the execution of the execution job may resume at or near the intermediate point of partial execution before termination. For example, if a determination is made to terminate execution of one or more execution jobs of a program on one or more computing nodes before the execution of those execution jobs is complete, the system manager component may initiate the persistent storage of the intermediate results from the partial execution of those execution jobs, such as at a location remote from those computing nodes. When the execution of those execution jobs is later resumed, whether on those same computing nodes or other computing nodes, the persistently stored intermediate results from the prior partial executions may be retrieved and used in the resumed execution in various ways. For example, if multiple operations of a particular terminated execution job had been completed before the termination, the intermediate results from the performance of those operations may be retrieved for the resumed execution, and those completed operations need not be performed again for the resumed execution.

The termination of partially completed execution jobs may be performed for various reasons in various embodiments. For example, in some embodiments a user who has requested execution of a program may request that the execution of some or all execution jobs for the program be suspended, such as for an indicated period of time or until the user later requests a resumption of the program suspension. In other embodiments, the DPE service may initiate the termination of the execution of one or more execution jobs of a program. For example, the execution of an execution job on a first computing node may be terminated and moved to another second computing node, such as if the first computing node is to be shut down for maintenance, is to be used for another execution job or other program (e.g., another execution job or other program with a higher priority), is being over-utilized, is showing signs of possible failure, is over-using one or more types of computing resources, etc. In addition, in a manner similar to that of the indicated user request, the DPE service may determine to suspend all execution of a program for a period of time.

In addition, as previously noted, in at least some embodiments, execution of an execution job that is automatically terminated may be automatically resumed at a later time by the DPE service. For example, in some such cases, the DPE service may continue to try to execute such an execution job until completion of the requested execution, until execution is cancelled or otherwise explicitly terminated by a user, until occurrence of a specified time (e.g., until occurrence of an expiration time, until occurrence of a cumulative execution time, etc), until occurrence of a specified number of executions, indefinitely, etc. In addition, in at least some such embodiments, at least some execution jobs that are automatically terminated may be automatically resumed on behalf of the user at a future time when a sufficient amount of program execution capacity again becomes available to continue the execution. Similarly, if the ongoing distributed execution of a program is stopped due to an insufficient quantity of computing nodes of a cluster being available to perform the distributed execution or otherwise having insufficient computing resources to perform the distributed execution, the DPE service may reschedule the distributed execution for a later time and/or automatically restart the distributed execution at a future time when a sufficient quantity of computing nodes or other sufficient amount of program execution capacity again becomes available to continue the execution.

As previously noted, various information may be locally stored on a computing node during execution of an execution job, and the locally stored information may be stored in various manners. For example, in some embodiments, a distributed file system or other distributed data store may be created on the multiple computing nodes used for distributed execution of a program, with a particular computing node's locally stored data being stored in the local portion of that distributed data store. Furthermore, if the distributed data store for a particular embodiment includes redundant data that allows for recovery of the data locally stored on a particular computing node that fails or otherwise becomes unavailable, then the availability of the output data from the execution of an execution job may be maintained in many situations for that embodiment even without the use of separate long-term storage for the DPE service. In other embodiments, some or all information may be stored in other manners, such as by not using a long-term storage location of the DPE service (e.g., by maintaining locally stored data on computing nodes until all execution for the program is completed) and/or by not using local storage on the computing nodes selected to assist in the distributed execution of a program (e.g., by storing any information that is not loaded in volatile memory on the computing node at a remote location, such as the DPE service's long-term storage location).

In addition, when intermediate results of partial execution on a computing node are persistently stored remotely from the computing node, the intermediate results may be stored in various manners. In some embodiments in which the DPE service uses a long-term storage location, the intermediate results may be stored in the DPE service's long-term storage location along with other completed results of execution jobs that have been completed. Alternatively, in some embodiments, the intermediate results for a particular computing node may be stored together, but in a manner distinct from the intermediate and/or completed results of other computing nodes. For example, in some embodiments, a remote logical storage volume may be created to mirror some or all of a local hard disk or other block data storage device for the computing node that was used to store the intermediate results, including a local portion of a distributed file system or other distributed data store. When the partial execution of the execution job for the computing node is later resumed, such a remote logical storage volume may be attached to the computing node on which the resumed execution is to occur, such as to allow the information in the attached logical storage volume to be copied to a physical block storage device of that computing node for use during the resumed execution, or the attached logical storage volume may instead be used during the resumed execution in lieu of any physical block storage device of that computing node. In some such embodiments in which logical storage volumes are available for use, the logical storage volumes may be created at the time of termination of an execution job on a computing node, while in other embodiments the logical storage volume for an execution job may be created at the beginning of the initial execution of the execution job on a computing node and used throughout the entire execution (e.g., in lieu of any physical block storage device of that computing node), even if the execution of the execution job is terminated and resumed one or more times.

Additional details related to the operation of examples of remote storage services that may be used to persistently store program state information and/or other information, including logical storage volumes, are available in U.S. patent application Ser. No. 12/188,943, filed Aug. 8, 2008 and entitled "Providing Executing Programs With Reliable Access To Non-Local Block Data Storage;" and in U.S. patent application Ser. No. 11/371,304, filed Mar. 8, 2006 and entitled "Distributed Storage System With Web Services Client Interface" and claiming priority benefit of U.S. Provisional Patent Application No. 60/754,726 filed Dec. 29, 2005, each of which is hereby incorporated by reference in its entirety. In addition, additional details related to example embodiments of executing different programs of different priorities at different times and to techniques for suspending and resuming distributed execution of programs are included in U.S. patent application Ser. No. 12/334,022, filed Dec. 12, 2008 and entitled "Managing Use Of Program Execution Capacity," and in U.S. patent application Ser. No. 12/334,004, filed and entitled "Saving Program Execution State," each of which is hereby incorporated by reference in its entirety. Furthermore, additional details related to enabling users to configure and modify distributed program execution are included in U.S. patent application Ser. No. 12/415,649, filed concurrently and entitled "Managing Distributed Execution Of Programs," which is also hereby incorporated by reference in its entirety.

In addition, as previously discussed, the managing of distributed execution of programs may be performed in various manners in various embodiments. For example, the determination of which computing nodes to use for execution of a program may be made in a variety of ways, including based on any preferences and/or requirements specified in configuration information that accompanies initiation of program execution or otherwise specified for the program and/or associated user (e.g., at a time of registration, etc.). For example, if criteria are determined for preferred and/or required resources for execution of a program (e.g., memory and/or storage; CPU type, cycles or other performance metric; network capacity; platform type, etc.), the selection of appropriate computing nodes to use may be based at least in part on whether the computing nodes have sufficient resources available to satisfy those resource criteria. In at least some situations, the multiple computing nodes selected for the distributed execution of an indicated program are referred to as a "cluster," and the initiation of the distributed execution of the indicated program on the cluster by the DPE service includes some or all of the following non-exclusive actions: selecting multiple computing nodes to be used as the cluster to perform the distributed execution of the indicated program; identifying one or more of the multiple nodes of the cluster to act as master nodes that control the execution of the program on the other nodes of the cluster; provisioning the multiple computing nodes of the cluster if needed to prepare them to receive software to be executed and input data to be used; obtaining the indicated input data to be used by the distributed execution of the indicated program; separating the obtained input data into multiple subsets that are each to be used on one of the multiple computing nodes of the cluster; separating the indicated program into multiple execution jobs to be executed on the multiple computing nodes of the cluster; for each of the multiple computing nodes, loading on the computing node software and optionally input data to be used for the distributed execution of the indicated program (e.g., software to execute at least one execution job for the computing node and a determined subset of the indicated input data to be used by the computing node); optionally configuring the loaded software on the various computing nodes (e.g., configuring the software loaded on the one or more master computing nodes to be able to use the other computing nodes of the cluster); establishing access controls for the multiple computing nodes of the cluster that enable the multiple computing nodes to inter-communicate as part of the executing of the indicated program; etc. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a DPE service, such that the DPE service may perform distributed execution of programs on behalf of a user in exchange for payment of one or more fees by that user. For example, in some embodiments, fees may be charged to a user based on an amount and/or type of distributed program execution capacity allocated for executing one or more programs on behalf of a user, such as based on one or more of a number of computing nodes in a cluster, a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. Fees may also be charged on the basis of a variety of use factors in some embodiments, such as a price per use of the service, a price per unit of time that computing services are used, a price per storage used, a price per data transferred in and/or out, etc. In at least some embodiments, a provider of a DPE service may offer one or more of various tiers, types and/or levels of services or functionality for distributed execution of programs on behalf of multiple users, and in some such embodiments, various fees may be associated with the various tiers, types and/or levels of services. Additional details related to various fees associated with a distributed program execution service are included in pending U.S. patent application Ser. No. 11/963,331, filed Dec. 21, 2007 and entitled "Providing Configurable Pricing for Execution of Software Images," which is hereby incorporated by reference in its entirety.

In addition, as previously noted, in at least some embodiments the DPE service provides an API to enable users to programmatically configure the distributed execution of programs and to modify ongoing distributed program execution. The following include non-exclusive examples of functions that may be provided as part of such an API: describe-cluster; run-cluster; terminate-cluster; set-cluster-proxy; upload-mapped-jar; upload-data; start-program; cancel-program; and get-program-status, in which "jar" refers to a file containing the indicated program to be executed. Furthermore, in at least some embodiments users may be enabled to configure a variety of characteristics for their clusters, including, for example, a degree of replication regarding how many copies (if any) to maintain of intermediate data during program execution, memory allocation to be used for particular programs (e.g., for use with a Java virtual machine), a loglevel for which information is tracked during debugging, etc. It will be appreciated that an API may include other functionality and be defined in other manners in other embodiments, and that the various functions of the API may each have appropriate variables or parameters whose values are specified as part of invoking the function.

In addition, in at least some embodiments, the DPE service may provide other types of functionality in at least some situations. For example, a user may initiate the distributed execution of a first program on a cluster of multiple computing nodes, but may maintain the cluster of multiple computing nodes even after the distributed execution of the first program has ended. One reason that the user may maintain the cluster is to execute a distinct second program on the existing cluster after the first program has ended, such as a second program that uses the same or similar configuration (e.g., the same type of program but with a new input data set), or instead a second program that uses generated results or other output data from the execution of the first program as input data for the distributed execution of the second program. As another example, in some embodiments, a user may be allowed to specify input data for use in the distributed execution of a program that is not static, such as if the input data continues to grow or expand while the program is executing—one example is a log file for a Web site or data that indicates ongoing transactions, with the distributed execution of the program analyzing each entry in the log or transaction data, such that the new log/transaction entries are analyzed as they are received (or later if the processing of the log/transaction data has not yet reached those new entries at the time of their receipt). Furthermore, in some embodiments a user may specify one or more types of limits regarding the distributed execution of a program (e.g., an amount of execution time; a cost of execution; an amount of usage of one or more types of computing resources, such as memory, storage, disk I/O, network I/O; etc.), with various specified types of actions that the DPE service is to take if a specified limit is reached (e.g., to notify the user, to suspend or terminate execution of the program, to reduce usage of a type of resource corresponding to the limit, etc.).

Furthermore, various other types of functionality may be provided and used by a DPE service in various embodiments, as discussed in greater detail elsewhere.

Figure 3:
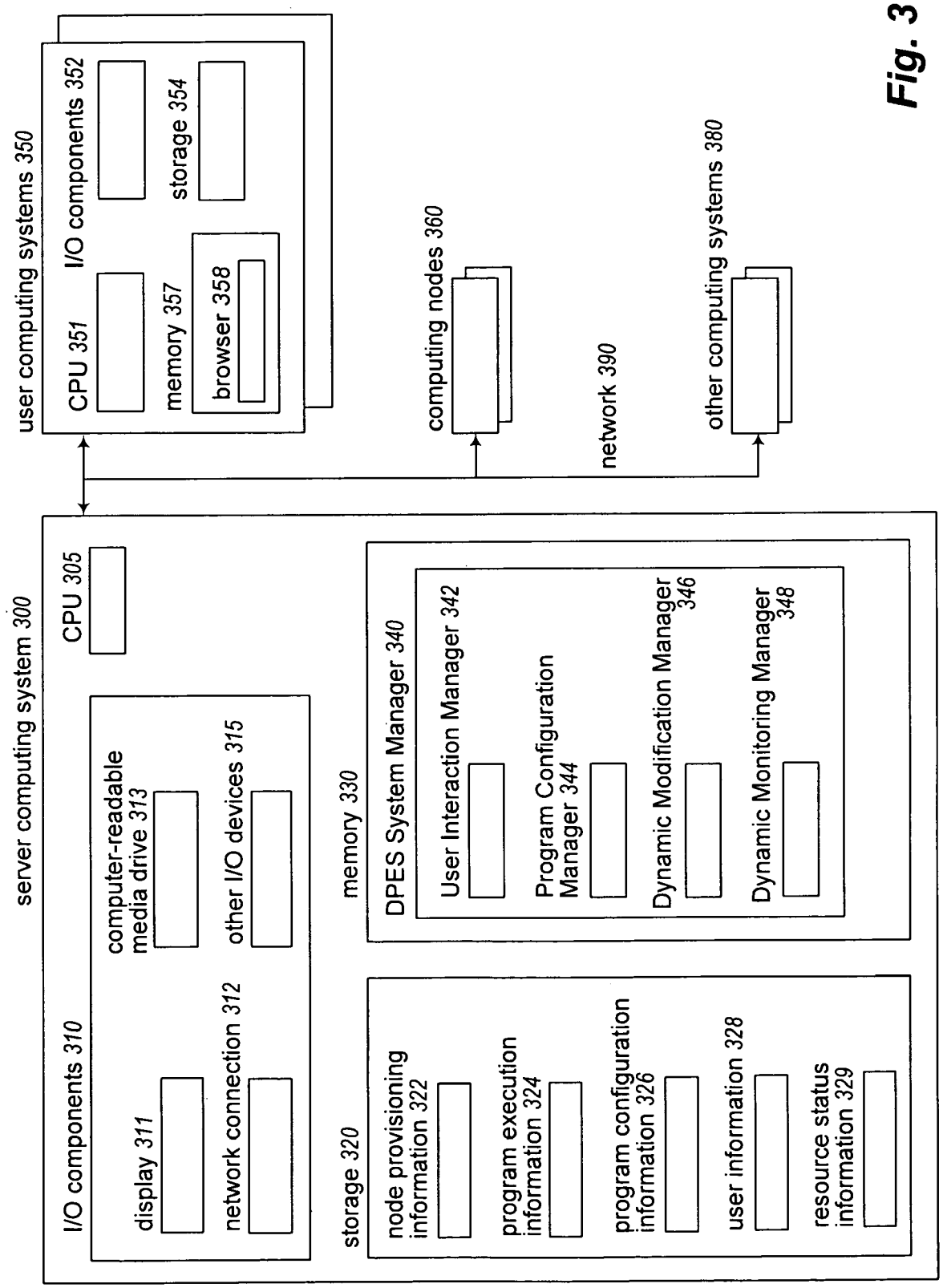
FIG. 3 is a block diagram illustrating an example embodiment of a computing system for managing distributed program execution.

FIG. 3 is a block diagram illustrating an example embodiment of a system suitable for performing techniques to manage distributed execution of programs. In particular, FIG. 3 illustrates a server computing system 300 suitable for executing an embodiment of a Distributed Program Execution Service System Manager module, as well as various user computing systems 350, computing nodes 360, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 380 and computing nodes 360 may also each include similar components to some or all of the components illustrated with respect to server computing system 300, but such components are not illustrated in this example for the sake of brevity.

An embodiment of a Distributed Program Execution Service System Manager module 340 is executing in memory 330, such as under control of CPU 305, and it interacts with computing systems 350 and 380 and computing nodes 360 over the network 390 (e.g., via the Internet and/or the World Wide Web, via a private cellular network, etc.). In this example embodiment, the DPESSM module 340 includes functionality related to managing distributed execution of programs on computing nodes 360 by various users (not shown) interacting with user computing systems 350, such as in conjunction with a DPE service managed by the DPESSM module 340. The other computing systems 350 and 380 and computing nodes 360 may be executing various software as part of interactions with the DPESSM module. For example, user computing systems 350 may be executing a Web browser 358 or other software in memory 357 to interact with DPESSM module 340, such as to interact with a User Interaction Manager module 342 of the DPESSM module to configure and/or request execution of programs on behalf of the users of those systems on one or more computing nodes 360 in various ways, and/or to track and optionally request modifications to ongoing distributed execution of programs. In addition, one or more users of the user computing systems 350 may interact with DPESSM module 340 to perform various other types of actions, as discussed in greater detail elsewhere.

Various information related to the operation of the DPESSM module 340 may be stored in storage 320, such as information 322 related to the computing nodes used to execute particular programs, information 328 about users of the distributed program execution service, information 324 that includes information about program execution (e.g., final execution results from program execution that has been completed, status information about the intermediate state of partial execution of various programs, etc.), user-specified and other configuration information 326 used to configure distributed execution of programs (e.g., specified execution configuration parameters), and information 329 regarding the status of resource usage by executing programs and indications of detected bottlenecks. In addition, various intermediate state information and other information may be persistently stored in various manners, as discussed in greater detail elsewhere, including on storage 320 of server computing system 300, on other computing systems 380, or on other computing nodes/systems or storage nodes/systems (not shown).

After the DPESSM module 340 receives requests (or other indications) to execute one or more programs on one or more computing nodes 360, along with specified configuration information, the DPESSM module 340 selects the computing nodes that will perform the distributed execution of the one or more programs, and initiates execution of execution jobs of those programs on those computing nodes 360. In addition, the DPESSM module 340 may further interact with computing nodes 360 to temporarily terminate or otherwise suspend execution of execution jobs on the computing nodes and to resume previously terminated execution, such as in response to user instructions. The DPESSM module 340 may also dynamically monitor or otherwise interact with one or more of the computing nodes 360 to track use of those computing nodes, such as under control of the Dynamic Monitoring Manager module 348 of DPESSM module 340, and may further dynamically modify the ongoing distributed execution of programs on the computing nodes 360, such as under control of the Dynamic Modification Manager module 346 of DPESSM module 340. In some embodiments the modules 346 and 348 may interact in various manners, such as if the module 346 requests or otherwise obtains information from the module 348, while in other embodiments the module 348 may store monitored information as part of information 329 and/or 324 and the module 346 may retrieve and use such stored information as desired. Furthermore, the Program Configuration Manager module 344 of DPESSM module 340 may use information gathered from the monitoring of the distributed execution of various programs to facilitate configuring the distributed execution of other programs, such as by determining preferred execution configuration parameters for particular predetermined types of programs and/or by determining recommended execution configuration parameters for particular indicated programs. The Program Configuration Manager module 344 may further interact with the User Interaction Manager module 342 in some situations, such as to provide determined configuration information, while in other embodiments such determined configuration information may be stored by module 344 as part of configuration information 326, and retrieved and used by module 342 from the stored configured information 326. Additional details related to these operations are included elsewhere.

The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the DPESSM module 340 may interact with one or more other computing systems 380 to initiate, suspend or resume execution of one or more programs on those computing systems, such as if the computing systems 380 are provided by one or more third-party participants.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DPESSM module 340 may in some embodiments be distributed in additional modules. Similarly, in some embodiments some of the functionality of the DPESSM module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
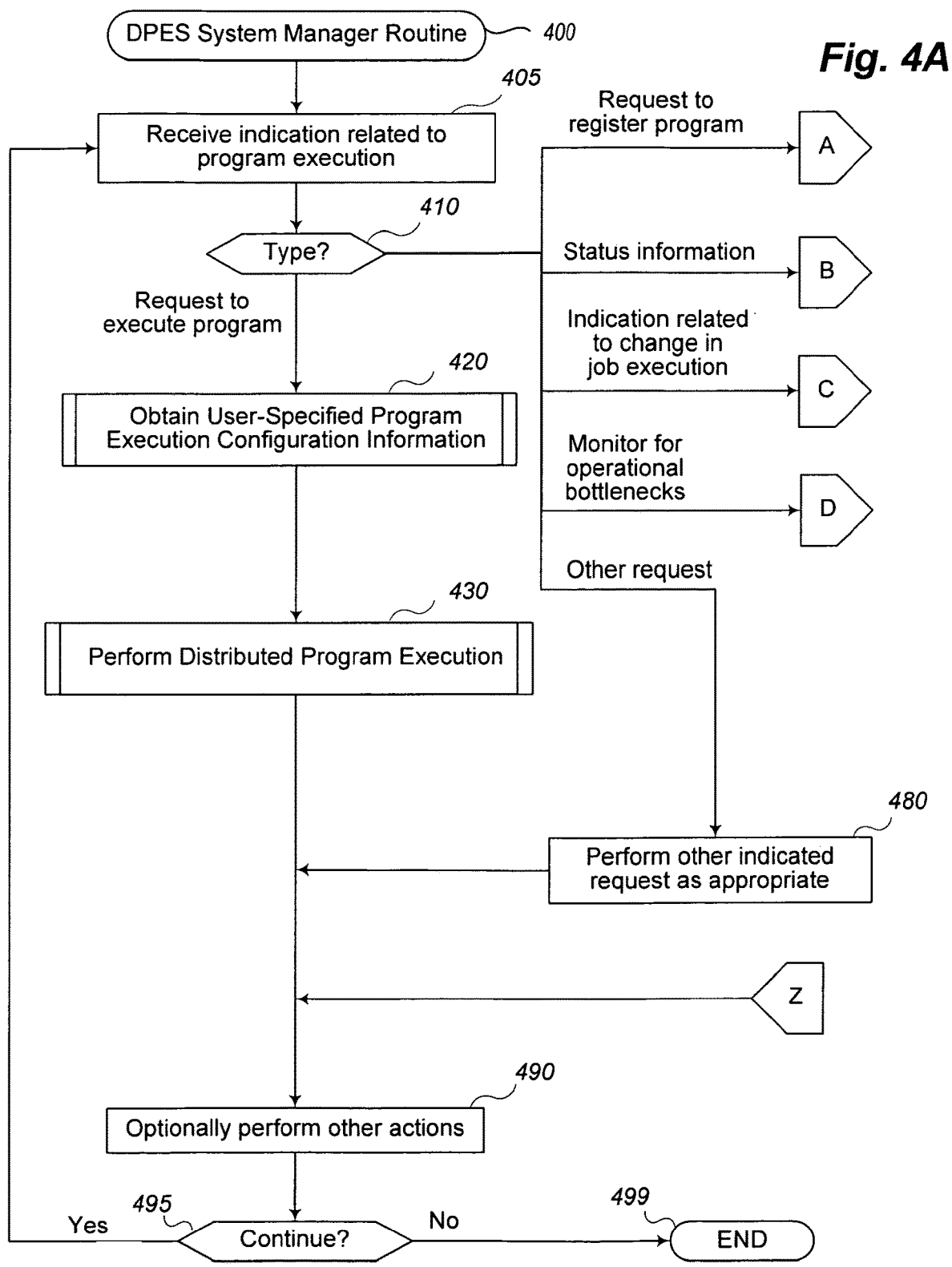
FIGS. 4A-4C illustrate a flow diagram of an example embodiment of a Distributed Program Execution Service System Manager routine.
Figure 4B:
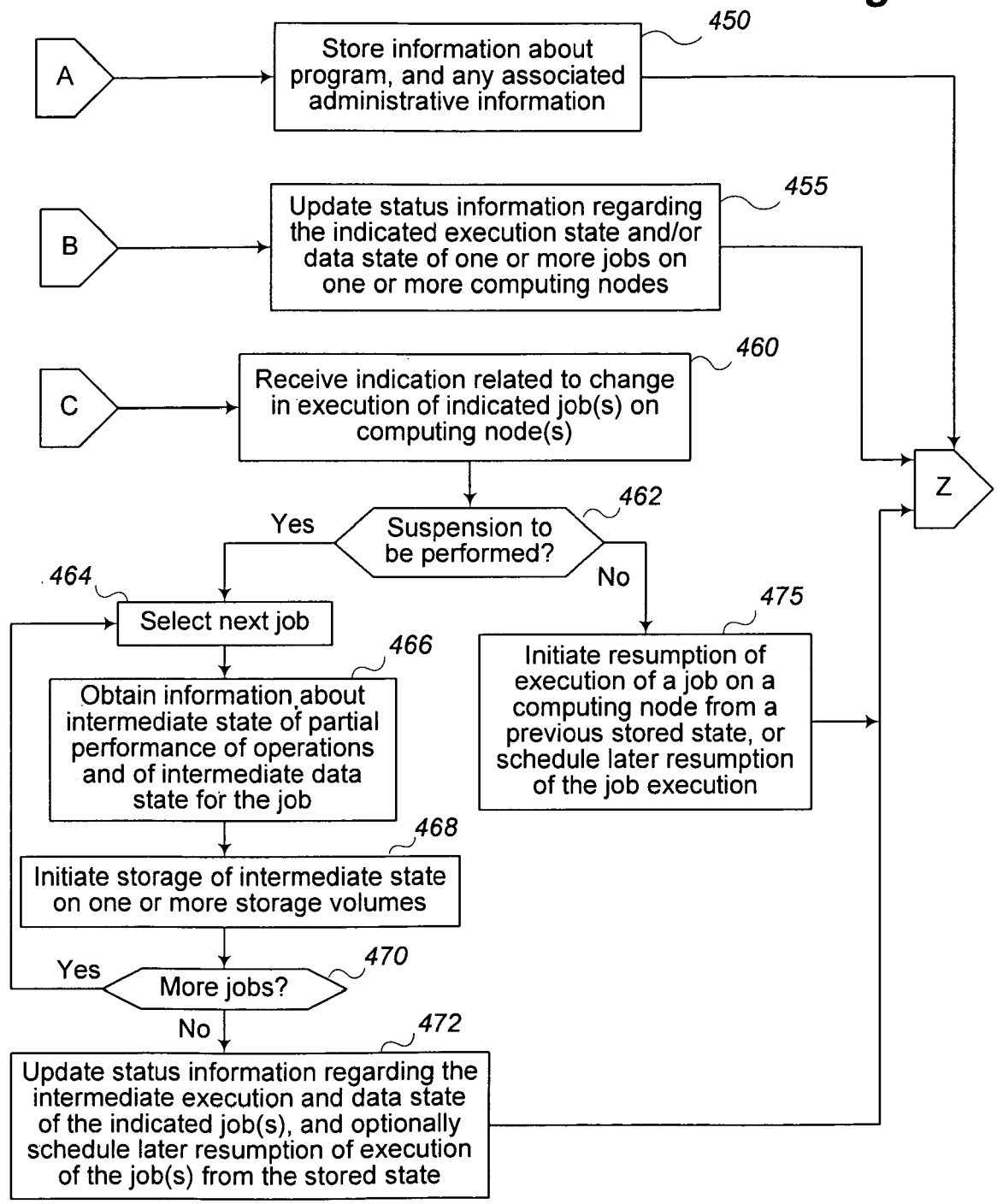
Figure 4C:
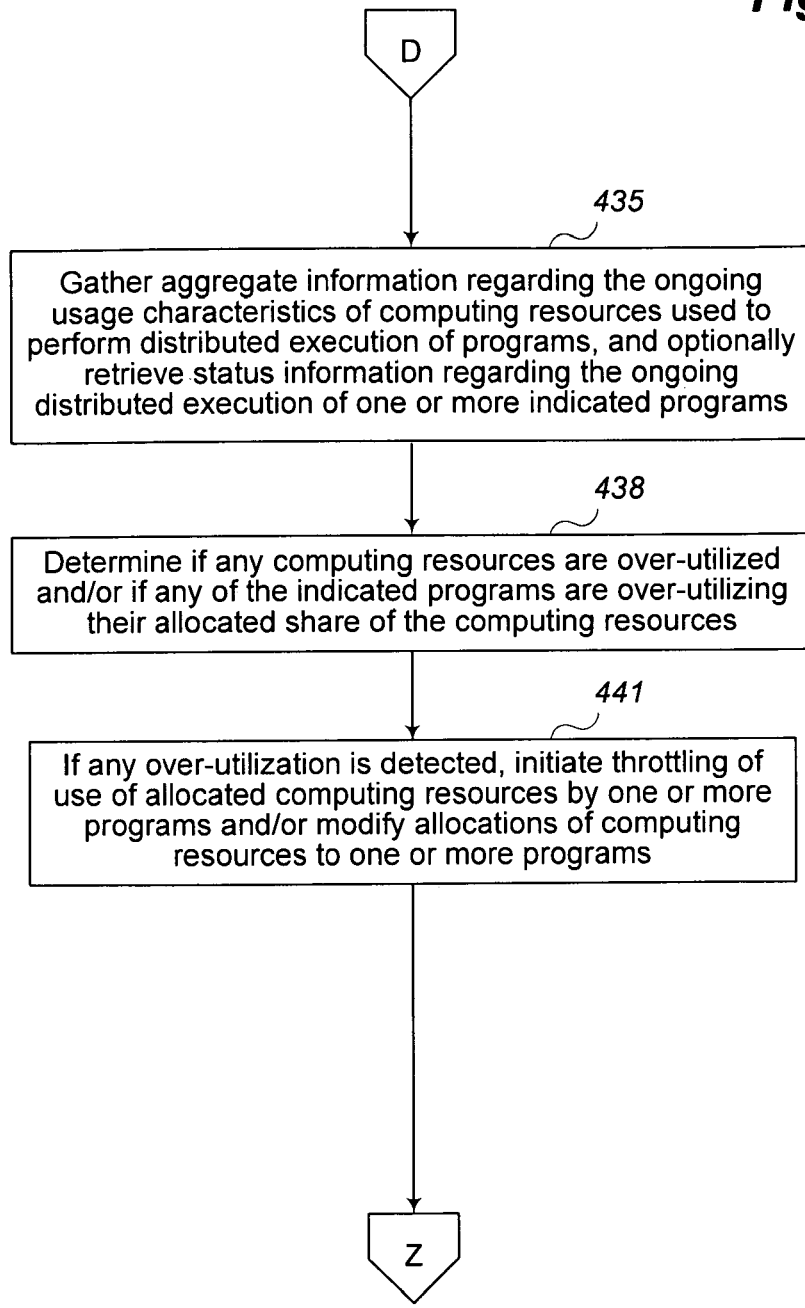

FIGS. 4A-4C are a flow diagram of an example embodiment of a Distributed Program Execution Service System Manager routine 400. The routine may be provided by, for example, execution of the DPESSM modules 110 and 180 of FIGS. 1A and 1B, respectively, and/or the DPESSM module 340 of FIG. 3, such as to manage distributed execution of programs, as well as to perform other types of actions in some situations. In this illustrated embodiment, the routine 400 manages various aspects of use of a DPE service that performs distributed execution of programs on behalf of multiple users.

In the illustrated embodiment, the routine begins at block 405, where information related to distributed program execution is received. The routine continues to block 410 to determine the type of received information. If it is determined in block 410 that a request is received to initiate execution of a program, such as from a user, the routine continues to block 420 to execute an Obtain User-Specified Program Execution Configuration Information routine. One example of such a routine is described in greater detail with respect to FIG. 5. After the program execution configuration information is obtained in block 420, the routine continues to block 430 to execute a Perform Distributed Program Execution routine. One example of such a routine is described in greater detail with respect to FIG. 6. While the obtaining of program execution configuration information and performing of distributed program execution in blocks 420 and 430 are illustrated as being performed in a synchronous manner, such that the routine 400 does not perform other operations during those blocks, it will be appreciated that the routine may continue to perform other operations asynchronously and simultaneously with the actions of blocks 420 and 430, including to monitor and modify ongoing program execution with respect to those blocks, as well as to perform other actions with respect to executing other programs for other users, as described elsewhere.

If it was instead determined in block 410 that the information received in block 405 was a request to register a program for later use, such as from a user, the routine instead continues to block 450 to store information about the program, along with associated administrative information (e.g., information about the user who submitted the program and/or about execution of the program, such as how to separate the program into multiple execution jobs, a type of the program, etc.). In some embodiments, such programs may be registered by users before they are used, such as to increase the speed of executing the program when such a program execution request is later received. Furthermore, in some embodiments, such a request to register a program may include a request to schedule later execution of the program, such as at an indicated time or when one or more indicated criteria are satisfied (e.g., when sufficient excess computing capacity of the DPE service is available to execute the program at a low priority).

If it is instead determined in block 410 that the information received in block 405 is status information related to execution of an execution job on a computing node for a program, such as may be supplied by that computing node or execution job (e.g., after being previously requested by the routine 400 as part of block 430), the routine continues to block 455 to update status information that is maintained by the routine 400 regarding the intermediate state of execution of that execution job and program. As discussed in greater detail elsewhere, the status information may include information about particular operations that have been initiated, completed, or are in progress, information about input data that has been used by the execution, information about output data that has been generated by completion of some or all operations, information about partial intermediate data that reflects ongoing execution of the execution job, etc.

If it is instead determined in block 410 that the information received in block 405 is an indication related to suspending or resuming execution of one or more execution jobs for one or more programs, such as from a user who initiated that execution and/or as previously specified by the routine 400 with respect to block 490, the routine continues to block 460 to receive information related to the execution modification. In block 462, the routine then determines whether the request relates to a temporary termination or other suspension of one or more currently executing execution jobs, or if it is instead related to resuming execution of a previously suspended execution job. If the latter, the routine continues to block 475 to initiate the resumption of execution of a previously suspended execution job on a computing node, such as by using previously stored state information about the intermediate results from the previous partial execution of the execution job, or instead schedules a later such resumption of the execution job if so indicated in the information received in block 460.

Otherwise, if there are one or more currently executing execution jobs to be temporarily terminated, the routine continues from block 462 to block 464 to select the next such execution job, beginning with the first. In block 466, the routine then obtains information about the current intermediate state of the partial execution of the operations being performed for the execution job and about the current data state for the execution job, and in block 468 initiates the storage of the intermediate state information on one or more storage volumes remote from the computing node that will persistently store the information for later use. In other embodiments, such as if the computing node includes management software to perform such intermediate state storage actions or if the execution job itself is configured to save its own intermediate state when instructed, the routine 400 may instead in block 466 and 468 send a message to the computing node and/or execution job to initiate such storage and then shut down. Furthermore, previously saved status information about the execution job may in some situations be used in blocks 466 and 468, such as to determine what intermediate state information is be stored, and any new information obtained in block 466 (e.g., by communicating with the computing node and/or execution job) may be used to update the status information for that execution job. The routine then continues to block 470 to determine if there are more execution jobs to be terminated, and if so returns to block 464. As previously discussed, in some embodiments the temporary termination may include temporarily terminating all execution jobs currently being executed for a program, such as to temporarily suspend execution of the program.

If it is instead determined in block 470 that there are no more execution jobs to terminate, the routine in block 472 updates status information regarding the intermediate state of the terminated execution jobs, and optionally schedules a later resumption of the execution of some or all of the execution jobs from the stored intermediate state. For example, in situations in which one or more execution jobs are being moved from a first group or one or more computing nodes to a second group or one or more other computing nodes, the later scheduled resumption of the execution of those execution jobs may occur in a substantially immediate manner, such that a user may be unaware of the termination and resumption of execution or of the movement of the execution job between computing nodes. In addition, the scheduling of the later resumption may include initiating a new request to be received in block 405 at the time of the later resumption that will prompt the previously discussed resumption activities with respect to block 475 for those execution jobs.

If it instead determined in block 410 that the type of information received in block 405 is an indication to dynamically monitor for operational bottlenecks, such as periodically or when triggered by a particular event, and optionally with respect to ongoing distributed execution of a particular indicated program or instead with respect to the ongoing distributed execution of some or all programs being executed by the DPE service, the routine continues to block 435. In block 435, the routine gathers aggregate information regarding the usage of computing resources by the ongoing distributed execution of one or more programs on one or more clusters, and optionally retrieves status information regarding that ongoing distributed execution of the one or more programs (e.g., status information previously received and stored with respect to block 455, status information that is dynamically obtained by interacting with some or all computing nodes of each cluster performing the distributed execution of one of the programs, etc.). As discussed elsewhere, the aggregate information regarding the usage of the computing resources may be obtained in various manners, including by interacting with some or all computing nodes of a cluster performing the distributed execution of a program to obtain information specific to those computing nodes, and then aggregating the various node-specific information. After block 435, the routine continues to block 438 to determine if the gathered aggregate computing resource usage information for the one or more programs indicates that any computing resources are being over-utilized. Such over-utilization of computing resources by the ongoing distributed execution of the one or more programs may, for example, create a bottleneck for at least one of those one or more programs and/or for one or more other programs, and/or may be based on the one or more programs using more computing resources than are allocated to those programs or that are otherwise expected to be used by those one or more programs. After block 438, the routine continues to block 441 to, if any over-utilization of computing resources is detected, take actions to reduce the over-utilization. Such actions may include, for example, initiating throttling of the use of the computing resources by at least one of the one or more programs, and/or may include modifying the amount of computing resources available to those one or more programs (e.g., to increase an allocation of computing resources available to those one or more programs, such that the current computing resource usage does not exceed the increased allocation), whether on the current computing nodes of one or more clusters or by modifying the computing nodes of the one or more clusters. In some embodiments, the actions of blocks 435-441 may be performed by, for example, the Dynamic Monitoring Manager module 348 and/or the Dynamic Modification Manager module 346 of FIG. 3, or otherwise by the DPESSM modules 110 and 180 of FIGS. 1A and 1B, respectively, or DPESSM module 340 of FIG. 3.

If it instead determined in block 410 that the type of information received in block 405 is another type of request, the routine continues instead to block 480 to perform the other indicated request as appropriate. Such other requests may include, for example, administrative operations with respect to users, such as users registering with the DPE service, users checking account information or other information of the DPE service, users tracking ongoing execution of their programs (e.g., by receiving some or all information about the intermediate state or other status of one or more of the execution jobs for the program), users providing payment with respect to currently or previously requested program executions or other provided functionality, etc.

After blocks 430, 441, 450, 455, 472, 475, or 480, the routine continues to block 490 to optionally perform one or more other tasks. Such other tasks may include, for example, one or more of the following: the DPE service automatically initiating the monitoring of the execution of various programs, such as by sending requests for status information to computing nodes (e.g., periodically, when indicated criteria are satisfied, etc.) and/or initiating the monitoring described with respect to blocks 435-441; automatically determining to temporarily terminate execution of execution jobs and/or to resume previously terminated execution of execution jobs in various circumstances, such as at scheduled times, to accommodate moving execution jobs between computing nodes, to maintain requested QoS levels for execution of a program (e.g., by maintaining execution of execution jobs within a maximum proximity to each other and/or to input data being used by the execution jobs, by maintaining a minimum proximity of execution to each other to enhance availability and reliability in the event of failure of multiple computing nodes in a single geographical location, etc.), to manage under-utilization and over-utilization of computing nodes (e.g., by modifying clusters and/or computing resources available to clusters), etc. After block 490, the routine continues to block 495 to determine whether to continue, such as until an explicit indication to terminate is received (e.g., from an operator of the DPE service). If it is determined to continue, the routine returns to block 405, and if not continues to block 499 and ends.

Figure 5:
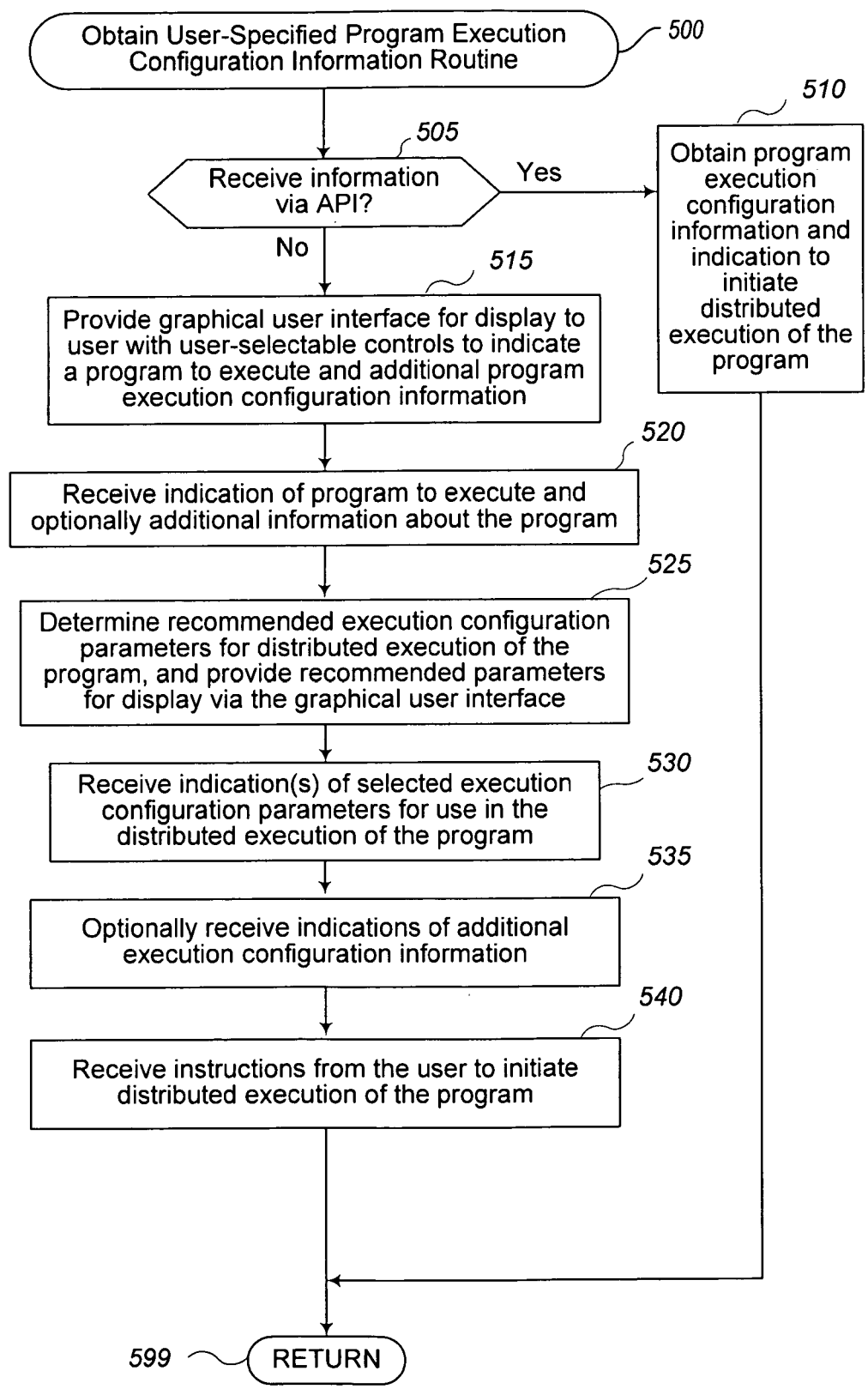
FIG. 5 illustrates a flow diagram of an example embodiment of a routine for obtaining user-specified program execution configuration information.

FIG. 5 is a flow diagram of an example embodiment of an Obtain User-Specified Program Execution Configuration Information routine 500. The routine may be provided by, for example, execution of the User Interaction Manager module 342 of the DPESSM module 340 of FIG. 3, or otherwise by the DPESSM modules 110 and 180 of FIGS. 1A and 1B, respectively, and may be initiated by block 420 of FIG. 4. The routine 500 interacts with users to determine configuration information to be used to execute indicated programs in a distributed manner on multiple computing nodes, including to determine various execution configuration parameters.

The routine begins in block 505, where an indication is received on behalf of a user regarding configuration information to be specified by the user regarding distributed execution of an indicated program. If it is determined in block 505 that the received indication is received via an API of the DPE service, the routine continues to block 510 to obtain and stored program execution configuration information via one or more API function calls, and to optionally store and aggregate such information over multiple API function calls. After the various program execution configuration information has been obtained, and an instruction is received via the API to initiate distributed execution of the indicated program in accordance with the specified configuration information, the routine in block 510 continues to block 599 and returns, including providing an indication of that specified configuration information and initiation instruction.

If it is instead determined in block 505 that the received indication is not received via an API, such as via a user interaction with a previously provided GUI of the DPE service or instead via a user request to obtain access to such a GUI, the routine continues instead to block 515 to provide (or update as appropriate) a GUI of the DPE service for display to the user, with the initial GUI screen(s) being configured to obtain information about an indicated program to execute and about various program execution configuration information. In block 520, the routine then receives information from one or more interactions of the user with the displayed GUI that indicates the program to be executed and optionally various other user-specified configuration information.

The routine then continues to block 525 to determine recommended execution configuration parameters for distributed execution of the indicated program, such as based at least in part on a type of the indicated program, and to provide an update to the displayed GUI to display information about the recommended execution configuration parameters. As described in greater detail elsewhere, the information about the recommended execution configuration parameters may be used in various manners and times in various embodiments, including for display to the user (e.g., for use as modifiable default values for the execution configuration parameters, for use in providing a warning about other user-specified execution configuration parameters, etc.). In addition, the determining of the recommended execution configuration parameters may be performed in various manners in various embodiments, such as by requesting the Program Configuration Manager module 344 of FIG. 3 to dynamically generate and provide such information, by retrieving and using stored information that was previously generated by the module 344 (e.g., as part of a preferred execution configuration parameters for a predefined template for the program type of the indicated program), etc.

In block 530, the routine then receives an indication of the selected execution configuration parameters for use in the distributed execution of the indicated program, and optionally receives indications of additional execution configuration information in block 535 (e.g., indications of input data to use for the distributed execution). The information received in blocks 530 and 535 may be based on one or more interactions of the user with the displayed GUI, such as to confirm to use some or all of the recommended execution configuration parameters, to use some or all execution configuration parameters as manually input by the user, etc. In addition, in will be appreciated that interactions with users via the GUI in blocks 515-540 may occur in various orders and across varying amounts of time, depending at least in part on choices that users make with respect to their interactions. After the various configuration information has been provided, the routine receives instructions from the user in block 540 to initiate the distributed execution of the indicated program in accordance with the specified configuration information, and continues to block 599 and returns, including providing an indication of that specified configuration information and initiation instruction.

While not illustrated here, it will be appreciated that in some embodiments a user may begin the interactions described with respect to FIG. 5, and then decide to explicitly cancel the interactions or otherwise fails to complete the interactions. In such situations, the routine may exit without providing an indication of the program execution initiation instruction (and optionally without any configuration information specified by the user before the cancellation/completion failure), and the routine 400 in FIG. 4 may instead determine to skip block 430 due to the lack of the program execution initiation instruction.

Figure 6:
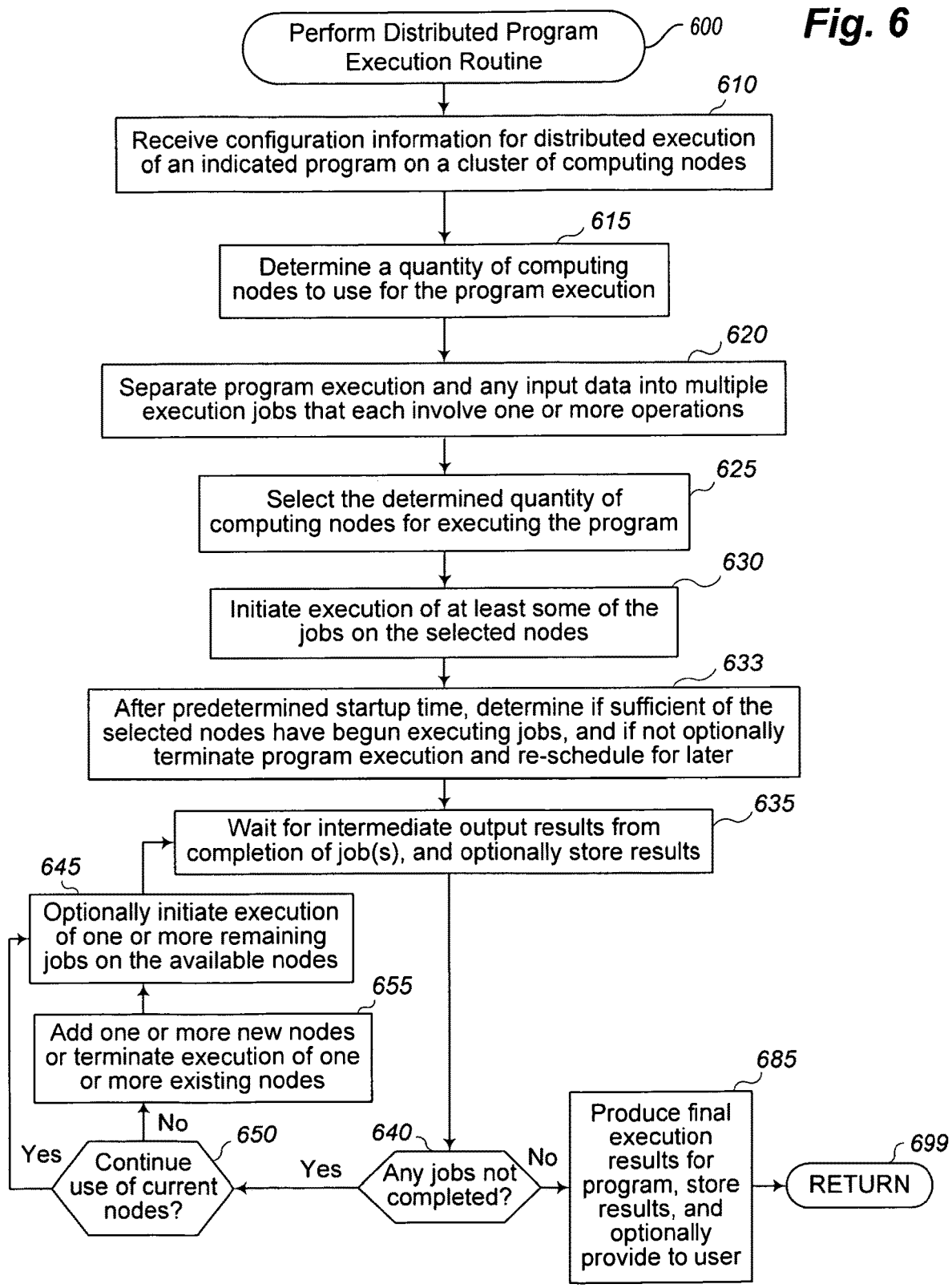
FIG. 6 illustrates a flow diagram of an example embodiment of a routine for performing distributed program execution.

FIG. 6 is a flow diagram of an example embodiment of a Perform Distributed Program Execution routine 600. The routine may be provided by, for example, execution of the DPESSM modules 110 and 180 of FIGS. 1A and 1B, respectively, and/or the DPESSM module 340 of FIG. 3, and may be initiated by block 430 of FIG. 4. The routine 600 performs operations to execute indicated programs in a distributed manner on multiple computing nodes in accordance with specified configuration information.

The routine begins in block 610, where it receives program execution configuration information for use in executing an indicated program, such as from the output of routine 500 of FIG. 5. After block 610, the routine continues to block 615 to determine a quantity of computing nodes to be used in a cluster for the program execution, such as is specified in the received execution configuration information, or otherwise automatically determined (e.g., based on preferred or default configuration information, a number of computing nodes that are currently available from the DPE service, a number of computing nodes to correspond to a number of execution jobs into which the program execution will be separated, an amount of fees paid by a user on whose behalf the request is made, etc.). In block 620, the routine separates the program execution and any received input data into multiple execution jobs that each involves one or more operations to be performed. The actions in blocks 615 and 620 may be performed in various manners in various embodiments, as discussed in greater detail elsewhere. For example, the program execution separation may be performed in a manner specified in the program execution configuration information, in an automated manner based at least in part on the design of the program, etc. After block 620, the routine continues to block 625 to select the determined quantity of computing nodes for use in distributed execution of the program, and in block 630 initiates the execution of at least some of the execution jobs on the selected nodes. As discussed in greater detail elsewhere, in some embodiments a user may specify a variety of other types of information, such as may be received as part of the configuration information received in block 610 and used as part of the actions in blocks 615-630.

After block 630, the routine continues to block 633 to, after a predetermined initial start-up time has passed, determine if sufficient of the computing nodes of the cluster have completed an initialization phase and begun actually performing the distributed execution of the program (e.g., executing one or more execution jobs of the program). If not, the routine in block 633 takes one or more predefined actions, which in some embodiments and situations may include stopping the distributed execution of the program on the computing nodes of the cluster (e.g., removing all of the computing nodes from the cluster), and optionally re-scheduling the distributed program execution to be attempted at a later time. The determining of whether sufficient computing nodes have begun performing the distributed program execution may include using predefined criteria specific to the program or standardized by the DPE service, and may be based on a minimum threshold of computing nodes (e.g., that a particular minimum threshold percentage of the cluster computing nodes, such as 90%, are available within a particular time threshold, such as 10 minutes; that a particular minimum threshold quantity of cluster computing nodes are available within a particular time threshold; etc.), a minimum threshold of computing resources being available (e.g., a specified percentage or total quantity of CPU cycles or other CPU utilization measure), etc. In addition, one or more particular cluster computing nodes may not have begun performing the distributed program execution for various reasons, such as the computing node having failed or otherwise become unavailable, the computing node having insufficient computing resources to have completed its initialization phase within the time period (e.g., based on a bottleneck and/or over-utilization of computing resources by one or more other programs), etc.

If it is determined in block 633 that the distributed program execution is to be terminated, the routine returns, and otherwise continues to block 635 to wait for execution jobs to complete and to optionally provide corresponding output data, such as may be used as input data to other execution jobs and/or may be used as part or all of the final results for the execution of the program. In some embodiments, the computing nodes may supply such output information back to the routine 400, such as for storage in a long-term storage location of the DPE service, while in other embodiments the output results may instead be stored on the computing nodes, and/or stored by the computing nodes on one or more long-term storage locations remote from the computing nodes. In the illustrated embodiment, blocks 630-655 are illustrated as being performed in a synchronous manner in which the routine 600 waits for execution jobs to complete before performing other actions. It will be appreciated that in other embodiments the routine 600 may operate in other manners, such as in an asynchronous manner to perform other actions with respect to executing the current program and/or to executing other programs for other users. In addition, it will be appreciated that in some situations errors may occur that cause one or more execution jobs to fail to complete, such as due to problems with the computing node on which the execution job is being performed, due to a network connection with the computing node, due to an error in the software corresponding to performing the execution job, due to problems with input data to be used for the performance of the execution job, etc. In such situations, the routine may take various actions to correct the errors (e.g., by transferring the execution job to another computing node), but if an irreversible error occurs, the routine may terminate the further distributed execution of the program or may instead attempt to complete as much of the distributed execution of the program as possible and provide incomplete final results along with an indication that the program executed is completed with errors.

In the illustrated example routine 600, after one or more execution jobs are determined in block 635 to be completed, the routine continues to block 640 to determine whether there are more execution jobs to be executed and/or to be completed. If so, the routine continues to block 650 to determine whether to continue using the current computing nodes of the cluster, or to instead modify the cluster computing nodes (e.g., to add or reduce the number of computing nodes in the cluster, to modify the particular computing nodes in the cluster, etc.). If it is determined in block 655 to modify the cluster computing nodes, the routine continues to block 655 to alter the cluster computing nodes, such as by adding one or more additional computing nodes and/or by removing one or more of the existing computing nodes. After block 655, or if it was instead determined in block 650 not to modify the cluster computing nodes, the routine continues to block 645 to optionally initiate execution of one or more remaining execution jobs on the available computing nodes of the cluster, such as if those remaining execution jobs were waiting for output data from one or more of the completed execution jobs, or if instead there are more execution jobs than computing nodes and the newly available computing nodes from the completion of the other execution jobs performance are now used to execute remaining execution jobs. After block 645, the routine returns to block 635 to wait for completion of other execution jobs. In some embodiments, the actions of blocks 633 and 650-655 may be performed by, for example, the Dynamic Monitoring Manager module 348 and/or the Dynamic Modification Manager module 346 of FIG. 3, or otherwise by the DPESSM modules 110 and 180 of FIGS. 1A and 1B, respectively, or DPESSM module 340 of FIG. 3.

If it is instead determined in block 640 that all of the execution jobs have completed, the routine continues to block 685 to produce final execution results for the program, and to optionally store those final results and/or provide them to the user. The final execution results may be generated or otherwise produced in various manners in various embodiments, such as by combining output results from multiple execution jobs in various ways, selecting the output results from a single execution job to use, etc. After block 685, the routine continues to block 699 and returns.

Figure 7:
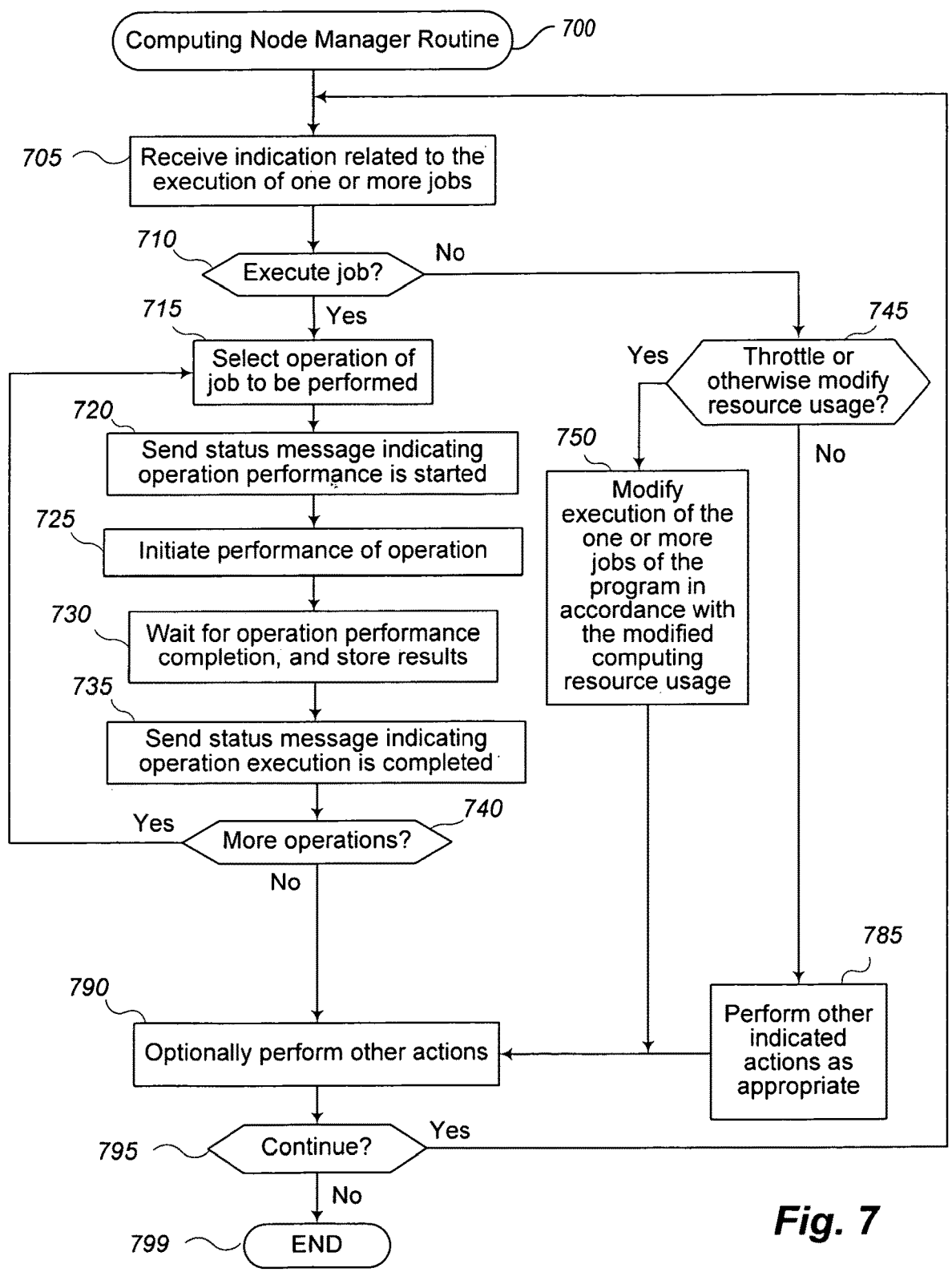
FIG. 7 illustrates a flow diagram of an example embodiment of a Computing Node Manager routine.

FIG. 7 is a flow diagram of an example of a Computing Node Manager routine 700. The routine may be provided by, for example, execution of module 179 of FIG. 1B, or of other management software executing on computing nodes 120 of FIG. 1A, computing systems 182 of FIG. 1B, computing nodes 360 of FIG. 3, etc. In the illustrated embodiment, the management software on a computing node manages some aspects of the execution of execution jobs on the computing node, while in other embodiments some or all of the functionality described with respect to FIG. 7 may instead be performed by the System Manager routine 400 of FIGS. 4A-4C, or instead by an execution job that is being executed on the computing node.

In the illustrated embodiment, the routine begins at block 705, where an indication is received related to the execution of one or more execution jobs on the computing node. The routine continues to block 710 to determine whether the indication is to initiate execution of an indicated execution job. If so, the routine determines the multiple operations to be performed for the execution job (e.g., based on the information received about the execution job in block 705 or that is otherwise retrieved from an external source), and continues to block 715 to select the next operation to be performed, beginning with the first. Blocks 715-740 are illustrated in this example embodiment as being performed in a serial manner, such that each operation is individually performed in a synchronous manner before the next operation is initiated, although it will be appreciated that in other embodiments the operations may be performed in other manners, such as to execute some or all of the operations in parallel and/or in an asynchronous manner.

After block 715, the routine continues to block 720 to send a status message to the routine 400 indicating that the execution of the selected operation has begun, and in block 725 initiates the performance of the operation. In block 730, the routine waits for the completion of the performance of the operation, and optionally locally stores any intermediate results produced by the operation performance. In block 735, the routine then sends another status message to the routine 400 indicating that the performance of the operation is completed. In block 740, the routine then determines whether there are more operations to be performed, and if so returns to block 715.

If was instead determined in block 710 that the received indication in block 705 was not to execute an execution job, the routine continues to block 745 to determine whether the received indication in block 705 is to throttle or otherwise modify computing resource usage by the computing node, such as may be indicated by the Dynamic Modification Manager module 346 of FIG. 3, or otherwise by the DPESSM modules 110 and 180 of FIGS. 1A and 1B, respectively, or DPESSM module 340 of FIG. 3. If so, the routine continues to block 750 to take actions to perform such throttling or other computing resource usage modification. For example, the throttling may include determining to block or restrict certain types of requests for resource usage by the computing node, and then continuing to perform such blocking or restricting as those types of requests are received. In other embodiments, the throttling or other modifying may include changing an allocation of a particular type of computing resource to the computing node, such that the computing node changes whether or not particular types of computing resource usage requests are made or are authorized by other entities (e.g., an operating system, another module that controls access to one or more types of computing resources, etc.). Other types of throttling or other modifying of computing resource usage may be performed in other embodiments.

If was instead determined in block 745 that the received indication in block 705 was not to throttle or otherwise modify computing resource usage, the routine continues instead to block 785 to perform one or more other indicated operations as appropriate. For example, the information received in block 705 may be a request for status information from the routine 400, and if so block 785 may obtain and provide that status information to the routine 400. Alternatively, the information in block 705 may be an indication to terminate execution of the execution job, and the actions performed in block 785 may include corresponding actions (e.g., to clear intermediate state information that was temporarily stored on the computing node, such as after that information has been persistently stored elsewhere). In addition, actions performed with respect to block 785 may include a request from the routine 400 to initiate such persistent storage of intermediate state from partial execution of operations for a currently executing execution job, and if so the actions in block 785 may include performing such actions (whether immediately or instead after a short time to allow completion of performance of one or more operations). Furthermore, in some embodiments and situations, different execution jobs may coordinate in various manners, such as by exchanging information of interest, and the information in block 705 may be such information from another execution job of the program or a request from such other execution job for information from the current execution job.

After blocks 750 or 785, or if it is instead determined in block 740 that there are no more operations to be performed, the routine continues to block 790 to optionally perform one or more other tasks, such as to coordinate with other execution jobs of the program if appropriate, to take administrative actions as part of executing the execution job, etc. After block 790, the routine continues to block 795 to determine whether to continue, such as until an explicit indication to terminate is received (e.g., from the routine 400 or from a human operator of the DPE service). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
receiving, by one or more configured computing systems of a program execution service that provides computing resources available to multiple users of the program execution service, instructions from a first user to execute a program using specified configuration information, the specified configuration information including a first number of virtual machines (VMs) to use to execute the program and a set of instructions specifying how to modify a number of VMs used during execution of the program based on central processing unit (CPU) utilization metrics, the set of instructions specifying an average CPU utilization threshold, the specified configuration information further specifying a maximum number of VMs that can be used to execute the program;
selecting, by the one or more configured computing systems, a group of multiple computing VMs from the computing resources based on the first number of VMs, and initiating execution of the program by the group of VMs based on the specified configuration information;
monitoring, by the one or more configured computing systems during the execution of the program, CPU utilization of the group of VMs, wherein the CPU utilization is based on a measured amount of CPU cycles used by the group of VMs;
determining, by the one or more configured computing systems based on the average CPU utilization of the group of VMs over a time interval exceeding the average CPU utilization threshold, a second number of VMs to use for executing the program according to the set of instructions, wherein the second number of VMs is greater than the first number of VMs and is less than or equal to the maximum number of VMs; and
modifying, by the one or more configured computing systems, a quantity of VMs in the group for use in further execution of the program, wherein the modifying includes adding one or more additional VMs to the group while the execution of the program is ongoing and using the one or more additional VMs for further execution of the program; wherein adding the one or more additional VMs to the group includes allocating computing resources of one or more physical computing systems to the one or more additional VMs.

2. The computer-implemented method of claim 1 wherein the method further comprises determining, by the one or more configured computing systems and during the execution of the program, that an actual degree of completion of the execution of the program is less than an expected degree of completion, and wherein the adding of the one or more additional VMs results in includes increasing a pace of the execution of the program after the adding.

3. The computer-implemented method of claim 1 further comprising removing one or more VMs from the group while one or more other VMs in the group continue the execution of the program.

4. The computer-implemented method of claim 3 wherein the removing of the one or more VMs is performed to provide a total quantity of VMs after the removing that is equal to a third number of VMs determined according to the set of instructions.

5. The computer-implemented method of claim 3 wherein a second defined threshold identifies a minimum preferred level, wherein the monitoring of the CPU utilization of the multiple VMs includes determining that the average CPU utilization of the group of VMs is below the minimum preferred level, and wherein the removing of the one or more VMs results in increasing the CPU utilization after the removing to above the minimum preferred level.

6. The computer-implemented method of claim 1 further comprising:
identifying one or more VMs of the group that are unavailable to participate in the execution of the program; and
adding one or more additional VMs to the group to replace the identified one or more unavailable VMs.

7. The computer-implemented method of claim 1 further comprising:
after completing the execution of the program, providing, by the one or more configured computing systems, final results from the execution to the first user.

8. The computer-implemented method of claim 1 wherein the program is configured to perform one or more map functions on each of multiple input data subsets and to perform one or more reduce functions on results of the one or more map functions, and wherein the method further comprises generating multiple jobs that are performed on the VMs of the group where each of the VMs implements at least one of the map functions or at least one of the reduce functions.

9. The computer-implemented method of claim 1 wherein the group of VMs, after the modifying, are executed using multiple physical computing systems that each hosts one or more of the group of VMs.

10. A non-transitory computer-readable medium having stored contents that cause one or more computing systems of a program execution service to:
receive, by the one or more computing systems of the program execution service, instructions from a first user to execute a program using specified configuration information, the specified configuration information including a first number of virtual machines (VMs) to use to execute the program and a set of instructions specifying how to modify a number of VMs used during execution of the program based on central processing unit (CPU) utilization metrics, the set of instructions specifying an average CPU utilization threshold, the specified configuration information further specifying a maximum number of VMs that can be used to execute the program;
select, by the one or more computing systems from a plurality of computing resources provided by the program execution service, a group of multiple VMs for use in execution of the program based on the first number of VMs;
monitor, by the one or more computing systems during the execution of the program, CPU utilization of the group of VMs, wherein the CPU utilization is based on a measured amount of CPU cycles used by the group of VMs;
determine, by the one or more computing systems based on the average CPU utilization of the group of VMs over a time interval exceeding the average CPU utilization threshold, a second number of VMs to use for executing the program according to the set of instructions, wherein the second number of VMs is greater than the first number of VMs and is less than or equal to the maximum number of VMs;
modify, by the one or more computing systems, a quantity of VMs in the group for use in further execution of the program, wherein the modifying includes adding one or more additional VMs to the group while the execution of the program is ongoing and using the one or more additional VMs for further execution of the program, wherein adding the one or more additional VMs to the group includes allocating computing resources of one or more physical computing systems to the one or more additional VMs.

11. The non-transitory computer-readable medium of claim 10 further comprising removing one or more VMs from the group while one or more other VMs in the group continue the execution of the program.

12. The non-transitory computer-readable medium of claim 11 wherein the removing of the one or more VMs is performed to provide a total quantity of VMs after the removing that is equal to a third number of VMs determined according to the set of instructions.

13. A system, comprising:
one or more hardware processors; and
one or more memories with stored instructions that, when executed by at least one of the one or more hardware processors, cause the system to:
receive instructions from a first user to execute a program using specified configuration information, the specified configuration information including a first number of virtual machines (VMs) to use to execute the program and a set of instructions specifying how to modify a number of VMs used during execution of the program based on central processing unit (CPU) utilization metrics, the set of instructions specifying an average CPU utilization threshold, the specified configuration information further specifying a maximum number of VMs that can be used to execute the program;
select, from a plurality of computing resources provided by an online service, a group of multiple VMs for use in execution of the program based on the first number of VMs;
monitor, during the execution of the program, CPU utilization of the group of VMs, wherein the CPU utilization is based on a measured amount of CPU cycles used by the group of VMs;

determine, based on the average CPU utilization of the group of VMs over a time interval exceeding the average CPU utilization threshold, a second number of VMs to use for executing the program according to the set of instructions, wherein the second number of VMs is greater than the first number of VMs and is less than or equal to the maximum number of VMs;

modify a quantity of VMs in the group for use in further execution of the program, including adding one or more additional VMs to the group while the execution of the program is ongoing and using the one or more additional VMs for further execution of the program, wherein adding the one or more additional VMs to the group includes allocating computing resources of one or more physical computing systems to the one or more additional VMs.

14. The system of claim 13, wherein the stored instructions when executed further cause the system to remove one or more VMs from the group while one or more other VMs in the group continue the execution of the program.

15. The system of claim 14, wherein the removal of the one or more VMs is performed to provide a total quantity of VMs after the removal that is equal to a third number of VMs determined according to the set of instructions.

16. The computer-implemented method of claim 1 wherein:
the determining the second number of VMs to use for executing the program according to the set of instructions comprises:
calculating, based on the set of instructions, a third number of VMs to be used, and
selecting the maximum number of VMs as the second number of VMs to be used instead of the third number of VMs based on the third number of VMs being larger than the maximum number of VMs.

17. The non-transitory computer-readable medium of claim 10 wherein:
the determining the second number of VMs to use for executing the program according to the set of instructions comprises:
calculating, based on the set of instructions, a third number of VMs to be used, and
selecting the maximum number of VMs as the second number of VMs to be used instead of the third number of VMs based on the third number of VMs being larger than the maximum number of VMs.

18. The computer-implemented method of claim 1, wherein the amount of CPU cycles used by the group of VMs is measured by a first one or more hypervisors, and wherein the computing resources of the one or more physical computing systems are allocated to the one or more additional VMs by a second one or more hypervisors.

19. The non-transitory computer-readable medium of claim 10, wherein the amount of CPU cycles used by the group of VMs is measured by a first one or more hypervisors, and wherein the computing resources of the one or more physical computing systems are allocated to the one or more additional VMs by a second one or more hypervisors.

20. The system of claim 13, wherein the amount of CPU cycles used by the group of VMs is measured by a first one or more hypervisors, and wherein the computing resources of the one or more physical computing systems are allocated to the one or more additional VMs by a second one or more hypervisors.

* * * * *